(12) United States Patent
Kimbrell et al.

(10) Patent No.: US 11,500,170 B2
(45) Date of Patent: Nov. 15, 2022

(54) BUTT CLOSURES AND BASES THEREFOR

(71) Applicant: AFL Telecommunications LLC, Duncan, SC (US)

(72) Inventors: Eddie Kimbrell, Dacula, GA (US); David Wittmeier, Greer, SC (US)

(73) Assignee: AFL Telecommunications LLC, Duncan, SC (US)

( * ) Notice: Subject to any disclaimer, the term of this patent is extended or adjusted under 35 U.S.C. 154(b) by 78 days.

(21) Appl. No.: 17/187,360

(22) Filed: Feb. 26, 2021

(65) Prior Publication Data

US 2021/0294054 A1    Sep. 23, 2021

Related U.S. Application Data

(63) Continuation of application No. 16/826,962, filed on Mar. 23, 2020, now Pat. No. 10,996,414.

(51) Int. Cl.
| | |
|---|---|
| *G02B 6/44* | (2006.01) |
| *G02B 6/38* | (2006.01) |
| *H02G 15/00* | (2006.01) |
| *H02G 15/013* | (2006.01) |
| *G02B 6/42* | (2006.01) |

(52) U.S. Cl.
CPC ......... *G02B 6/4444* (2013.01); *G02B 6/3897* (2013.01); *G02B 6/4261* (2013.01); *H02G 15/003* (2013.01); *H02G 15/013* (2013.01)

(58) Field of Classification Search
CPC .. G02B 6/4444; G02B 6/3897; G02B 6/4261; H02G 15/003; H02G 15/013
See application file for complete search history.

(56) References Cited

U.S. PATENT DOCUMENTS

| | | |
|---|---|---|
| 5,313,019 A | 5/1994 | Brusselmans et al. |
| 5,426,715 A | 6/1995 | Moisson |
| 5,675,124 A | 10/1997 | Stough et al. |
| (Continued) | | |

FOREIGN PATENT DOCUMENTS

| | | |
|---|---|---|
| CN | 2886229 Y | 4/2007 |
| CN | 201788304 U | 4/2011 |
| (Continued) | | |

OTHER PUBLICATIONS

International Search Report for International Application No. PCT/US2021/022311 dated Jul. 6, 2021; 2 pages.

*Primary Examiner* — Ellen E Kim
(74) *Attorney, Agent, or Firm* — Dority & Manning, P.A.

(57) ABSTRACT

A butt closure base includes a base housing defining a plurality of cavities. A first gel is disposed in each of the plurality of cavities. The butt closure base further includes a plurality of wedge assemblies, each of the plurality of wedge assemblies removably insertable into one of the plurality of cavities. Each of the plurality of wedge assemblies includes an outer cover, a second gel, and a main pressure plate in contact with the second gel. The main pressure plate is movable along a longitudinal axis to apply pressure to the second gel. Each of the plurality of wedge assemblies further includes a latch assembly. The latch assembly includes an adjustable tab and a stop member movable between a first position which limits movement of the adjustable tab and a second position in which movement of the adjustable tab is not limited by the stop member.

15 Claims, 25 Drawing Sheets

(56) References Cited

U.S. PATENT DOCUMENTS

| | | | |
|---|---|---|---|
| 5,775,702 A | 7/1998 | Laeremans et al. | |
| 6,231,051 B1 | 5/2001 | Mueller et al. | |
| 6,292,614 B1 | 9/2001 | Smith et al. | |
| 6,344,615 B1 | 2/2002 | Nolf et al. | |
| 6,359,228 B1 | 3/2002 | Strause et al. | |
| 6,411,767 B1 | 6/2002 | Burrous et al. | |
| 6,496,640 B1 | 12/2002 | Harvey et al. | |
| 6,539,160 B2 | 3/2003 | Battey et al. | |
| 6,778,752 B2 | 8/2004 | Laporte et al. | |
| 6,802,512 B2 | 10/2004 | Muller et al. | |
| 6,875,926 B2 | 4/2005 | Buekers et al. | |
| 7,005,582 B2 | 2/2006 | Muller et al. | |
| 7,114,727 B1 | 10/2006 | Goll | |
| 7,141,738 B2 | 11/2006 | Marsac et al. | |
| 7,214,735 B2 | 5/2007 | Jego Stora | |
| 7,417,190 B2 | 8/2008 | Pini | |
| 7,464,728 B2 | 12/2008 | Cairns | |
| 7,631,880 B2 | 12/2009 | Hellkvist | |
| 7,650,055 B2 | 1/2010 | Cox et al. | |
| 7,683,261 B2 | 3/2010 | Kesler et al. | |
| 7,689,090 B2 | 3/2010 | Kluwe et al. | |
| 7,780,173 B2 | 8/2010 | Mullaney et al. | |
| 7,781,684 B2 | 8/2010 | Stuckmann et al. | |
| 7,799,995 B2 | 9/2010 | Mullaney et al. | |
| 7,845,990 B2 | 12/2010 | Shrum et al. | |
| 8,050,528 B2 | 11/2011 | Shimirak et al. | |
| 8,207,445 B2 | 6/2012 | Knorr et al. | |
| 8,513,543 B1 | 8/2013 | Lin | |
| 8,604,360 B2 | 12/2013 | Knorr et al. | |
| 8,686,289 B2 | 4/2014 | Burke et al. | |
| 8,772,641 B2 | 7/2014 | Badura et al. | |
| 8,891,930 B2 | 11/2014 | Anguiano et al. | |
| 9,368,952 B2 | 6/2016 | Vanhentenrijk et al. | |
| 9,502,878 B2 | 11/2016 | Coenegracht et al. | |
| 9,647,437 B2 | 5/2017 | Aznag et al. | |
| 9,685,776 B2 | 6/2017 | Coenegracht et al. | |
| 9,719,614 B2 * | 8/2017 | Blaser | G02B 6/4444 |
| 9,765,908 B2 | 9/2017 | Andersson et al. | |
| 9,966,751 B2 | 5/2018 | Thompson et al. | |
| 2009/0309313 A1 * | 12/2009 | Knorr | G02B 6/4444 |
| | | | 277/626 |
| 2013/0020771 A1 * | 1/2013 | Vanhentenrijk | F16J 15/102 |
| | | | 277/605 |
| 2018/0252887 A1 | 9/2018 | Coenegracht et al. | |

FOREIGN PATENT DOCUMENTS

| | | |
|---|---|---|
| CN | 101095202 B | 5/2011 |
| CN | 204517353 U | 7/2015 |
| CN | 205608265 U | 9/2016 |
| CN | 205622184 U | 10/2016 |
| CN | 106684804 A | 5/2017 |
| CN | 105116507 B | 8/2018 |
| DE | 102010025096 B3 | 1/2012 |
| DE | 202011050587 U1 | 11/2012 |
| DE | 202012013316 U | 4/2016 |
| DE | 102016111753 A1 | 9/2017 |
| DE | 202017104619 U1 | 12/2018 |
| EP | 2251729 B1 | 3/2012 |
| EP | 2198335 B1 | 6/2012 |
| EP | 1970737 B1 | 10/2012 |
| EP | 2557442 A1 | 2/2013 |
| EP | 2375524 B1 | 1/2014 |
| EP | 2557443 B1 | 3/2014 |
| EP | 2520960 B1 | 7/2014 |
| EP | 2521230 B1 | 7/2014 |
| EP | 2597744 B1 | 1/2015 |
| EP | 2290418 B1 | 6/2015 |
| EP | 3084904 A1 | 10/2016 |
| EP | 3106908 A1 | 12/2016 |
| FR | 2883110 A1 | 9/2006 |
| GB | 2546750 A | 8/2017 |
| WO | 2014095660 A1 | 6/2014 |
| WO | 2017050676 A1 | 3/2017 |
| WO | 2017102408 A1 | 6/2017 |
| WO | 2018158362 A1 | 9/2018 |
| WO | 2018162691 A1 | 9/2018 |
| WO | 2018192901 A1 | 10/2018 |
| WO | 2018197410 A1 | 11/2018 |
| WO | 2018231833 A1 | 12/2018 |
| WO | 2018234579 A1 | 12/2018 |
| WO | WO2018234579 A1 | 12/2018 |
| WO | WO2019217615 A2 | 11/2019 |
| ZA | 200306932 A | 7/2004 |

* cited by examiner

BUTT CLOSURES AND BASES THEREFOR

This application is a continuation of U.S. patent application Ser. No. 16/826,962, filed on Mar. 23, 2020, the disclosure of which is incorporated by reference herein in its entirety.

FIELD

The present disclosure relates generally to closures, such as for fiber optic cable connections, and more specifically to improved bases for butt closures.

BACKGROUND

Certain closures, referred to as "butt" or "domed" closures, are utilized in outdoor environments to facilitate the connection of transmission cables such as fiber optic cables. The cables enter the closure through a sealed base, and connection of the cable elements occurs within the closure. In the case of fiber optic cables, spliced-together optical fibers are held within the closure.

In many cases, the closure must be sealed to a significant exterior pressure, in some cases to a 20 foot waterhead pressure or more. Further, the closure must accommodate a large range of cables. For example, cable diameters for medium size closures can range from 0.4" to 1.2" and for smaller cables, multiple cables (such as three and/or four) must pass through a single port.

Many known closures use through-holes in the bases thereof with seals that enter into the ports defined in the bases. However, such seals in many cases are not reliable or are difficult to utilize. Additionally, in many cases, known closures require that all seals be sealed and unsealed together as a single sealing system.

Accordingly, improved bases for use with butt closures would be advantageous. Specifically, bases which provide improved sealing for a large variety of cable diameters and which are easy and efficient to utilize are desired.

BRIEF DESCRIPTION

Aspects and advantages of the invention will be set forth in part in the following description, or may be obvious from the description, or may be learned through practice of the invention.

In accordance with one embodiment, a butt closure base is provided. The butt closure base includes a base housing extending along a longitudinal axis between a first outer surface and a second outer surface, the base housing defining a plurality of cavities between the first and second outer surfaces, the plurality of cavities aligned in an annular array. A first gel is disposed in each of the plurality of cavities. The butt closure base further includes a plurality of wedge assemblies, each of the plurality of wedge assemblies removably insertable into one of the plurality of cavities. Each of the plurality of wedge assemblies includes an outer cover, a second gel, and a main pressure plate in contact with the second gel. The main pressure plate is movable along the longitudinal axis to apply pressure to the second gel.

In accordance with another embodiment, a butt closure is provided. The butt closure includes a cover defining an interior and an opening which provides access to the interior. The butt closure further includes a tray assembly insertable into the interior. The butt closure further includes a base insertable at least partially into the interior. The base includes a base housing extending along a longitudinal axis between a first outer surface and a second outer surface, the base housing defining a plurality of cavities between the first and second outer surfaces, the plurality of cavities aligned in an annular array. A first gel is disposed in each of the plurality of cavities. The base further includes a plurality of wedge assemblies, each of the plurality of wedge assemblies removably insertable into one of the plurality of cavities. Each of the plurality of wedge assemblies includes an outer cover, a second gel, and a main pressure plate in contact with the second gel. The main pressure plate is movable along the longitudinal axis to apply pressure to the second gel.

In some exemplary embodiments, each of the plurality of wedge assemblies further includes a latch assembly. The latch assembly includes an adjustable tab and a stop member movable between a first position which limits movement of the adjustable tab and a second position in which movement of the adjustable tab is not limited by the stop member.

In some exemplary embodiments, each of the plurality of wedge assemblies further comprises an outer flange extending from the outer cover, and wherein each of the plurality of wedge assemblies further comprises a plurality of apertures defined at an intersection between the outer flange and the outer cover, and wherein the second gel extends through each of the plurality of apertures.

In some exemplary embodiments, each of the plurality of cavities is defined between surfaces of opposing sidewalls, and wherein the surfaces extend substantially parallel to each other.

In some exemplary embodiments, movement of the pressure plate is caused by an actuator. In some embodiments, the actuator is a screw having a first thread portion and a second thread portion, wherein a second outer diameter of the second thread portion is greater than a first outer diameter of the first thread portion. In some embodiments, a seal assembly is disposed between the cover and the base. The seal assembly may include a seal member and a support member, the seal member connected to the support member.

In some embodiments, each of the plurality of wedge assemblies further includes an outwardly extending portion extending between the outer flange and the outer cover.

In accordance with another embodiment, a wedge assembly for a butt closure base is provided. The wedge assembly includes an outer cover and a main pressure plate moveable along a longitudinal axis. The wedge assembly further includes a latch assembly, the latch assembly comprising an adjustable tab and a stop member movable between a first position which limits movement of the adjustable tab and a second position in which movement of the adjustable tab is not limited by the stop member.

In some exemplary embodiments, the wedge assembly further includes a gel. The main pressure plate is in contact with the gel and is movable along the longitudinal axis to apply pressure to the gel.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION

A full and enabling disclosure of the present invention, including the best mode thereof, directed to one of ordinary skill in the art, is set forth in the specification, which makes reference to the appended figures, in which.

DETAILED DESCRIPTION

Figure 1:
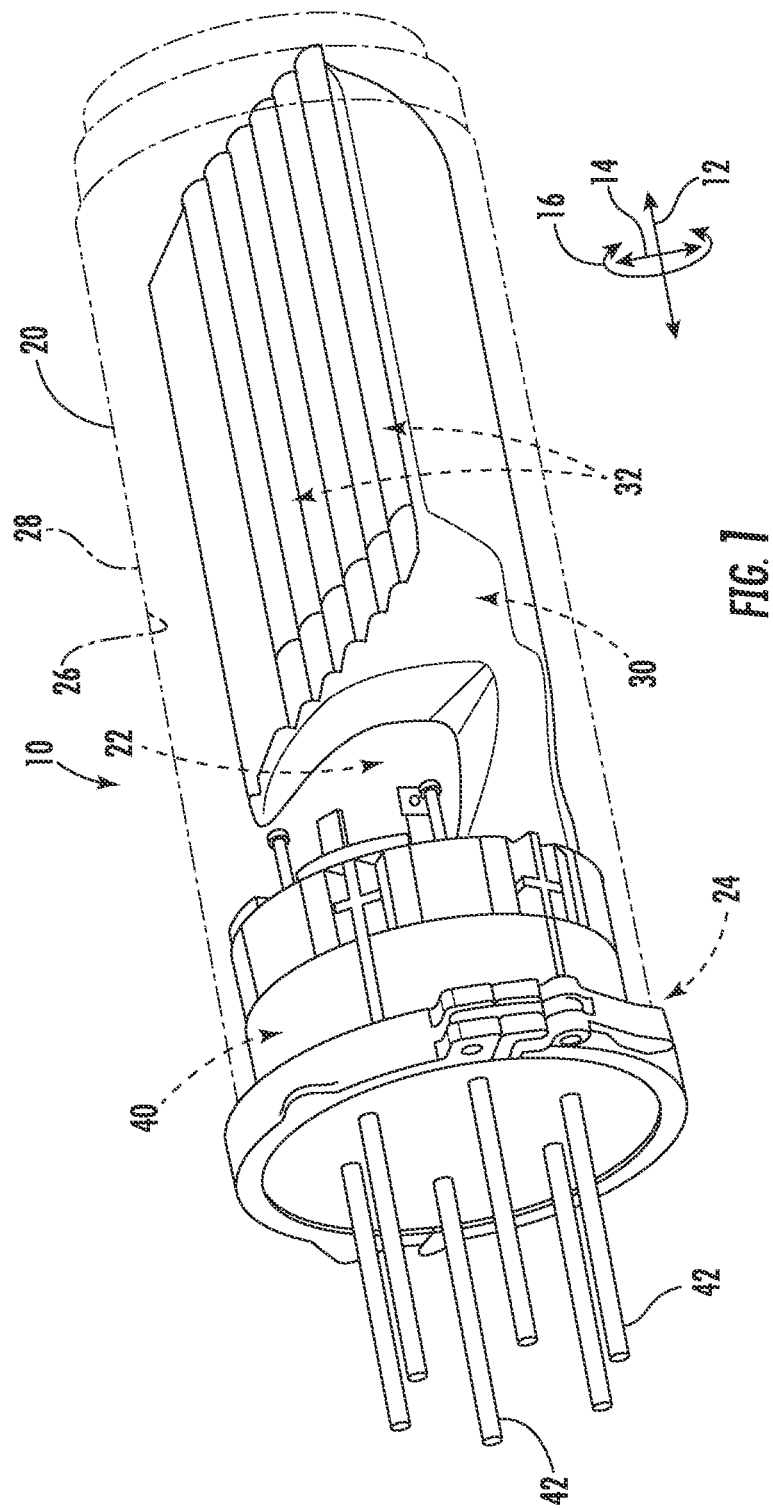
FIG. 1 is a perspective view of a butt closure in accordance with embodiments of the present disclosure.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Referring now to FIGS. 1 through 32, embodiments of butt closures 10 in accordance with the present disclosure are provided. Closures 10 in accordance with the present disclosure, and in particular the bases thereof, advantageously provide improved sealing when utilized with a large variety of cable diameters. Additionally, closures 10 and bases thereof are easy and efficient to utilize in the field, with the installation of cables in a base in a secure, sealed manner being easily and efficiently accomplished.

Various additional advantages of closures and bases in accordance with the present disclosure include: the use of gel allows for use of a large range of cable diameters; the wedge assembly design allows cables to be installed by laying them into the wedge are and not having to feed them through a round port; molding of the gel through apertures in the wedge assembly allows the gel to be stable and robust and to stay in position in the wedge assembly; the gel extending through the apertures seals with the sealing assembly, thus improving sealing of the cover and base of the closure together; in some embodiments, a plate on the outside of the wedge seal automatically pressurizes the gel when the closure is submerged in water which improves the sealing pressure; the cable collar assembly includes self-orienting features for the cable clamp thereof; and/or the seal member between the base and the cover is contained in the dome using a snap feature or fastener which prevents accidental loss of the seal member.

A coordinate system may be defined for a closure 10 and components thereof. Such coordinate system may include a longitudinal axis 12, a radial axis 14, and a circumferential axis 16, as shown.

Referring now to FIG. 1, a closure 10 in accordance with the present disclosure includes a cover 20. Cover 20 is generally a domed cover which defines an interior 22 and an opening 24 which provides access to the interior 24. Cover 20 may include an inner surface 26 which defines the interior 22 and an opposing outer surface 28 which is exposed to the external environment.

A tray assembly 30 may be insertable into (and thus disposed within) the interior 22, such as along the longitudinal axis 12. Tray assembly 30 may include one or more splice trays 32 or other suitable components for facilitating transmission component connections. For example, in the case of use with fiber optic cables, splices between optical fibers thereof may be housed in the various splice trays.

A base 40 may be insertable at least partially into (and thus disposed at least partially within) the interior 22, such as along the longitudinal axis 12. In some embodiments, tray assembly 30 may be connected to the base 40, such that insertion of the base 40 causes insertion of the tray assembly 30 into the interior 22. Cables 42 may be inserted through the base 40 into the interior 22, and connection between transmission elements thereof (such as optical fibers) may be made within the interior 22. Accordingly, the base 40 may provide improved sealing around such cables 42, such that leakage of water or other unwanted environmental materials are prevented from entering the interior 22.

Figure 17:
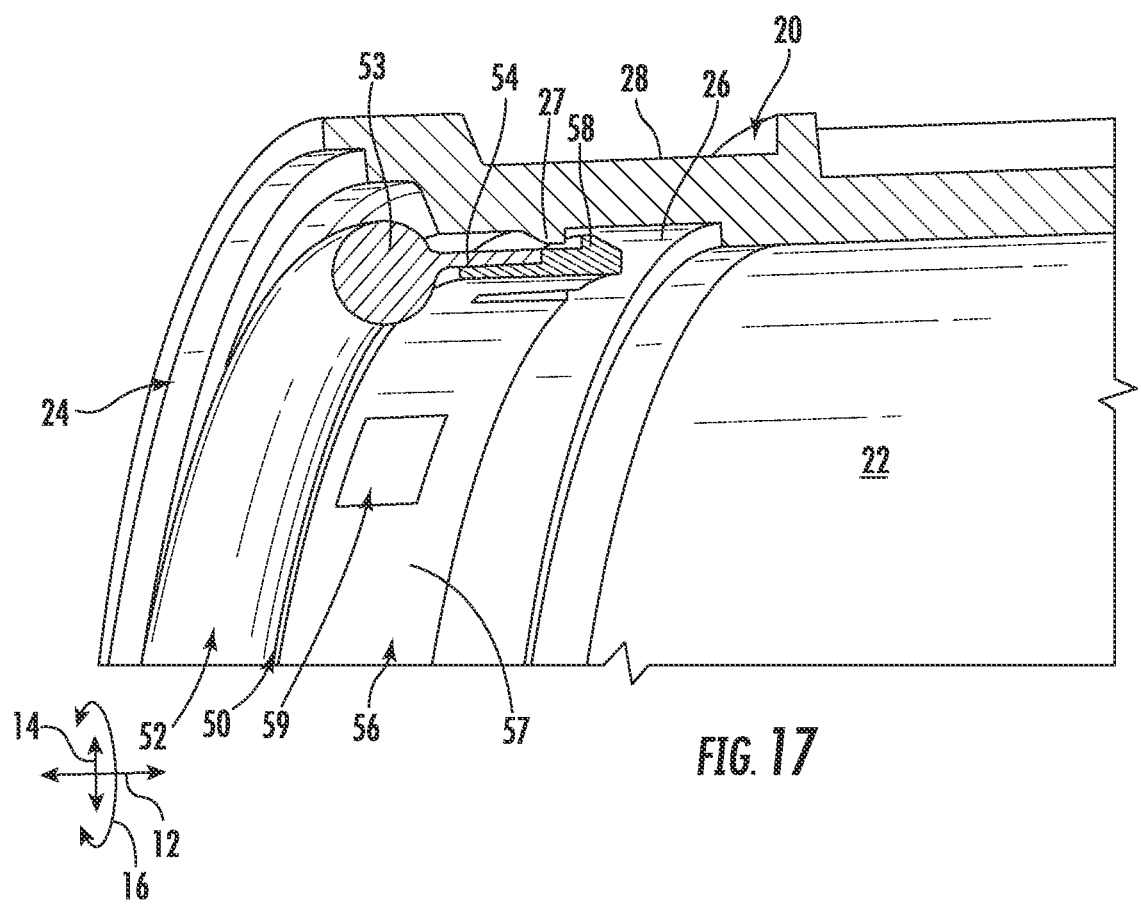
FIG. 17 illustrates a portion of the closure cover and a seal assembly in accordance with embodiments of the present disclosure.
Figure 18:
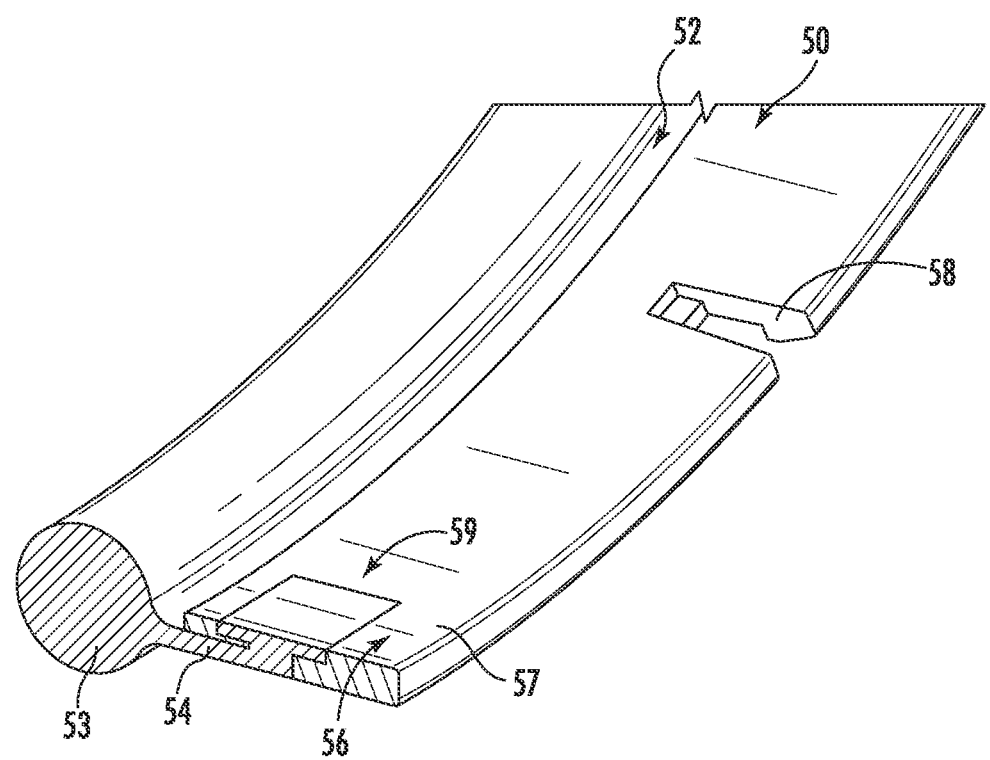
FIG. 18 is a perspective view of a seal assembly in accordance with embodiments of the present disclosure.
Figure 19:
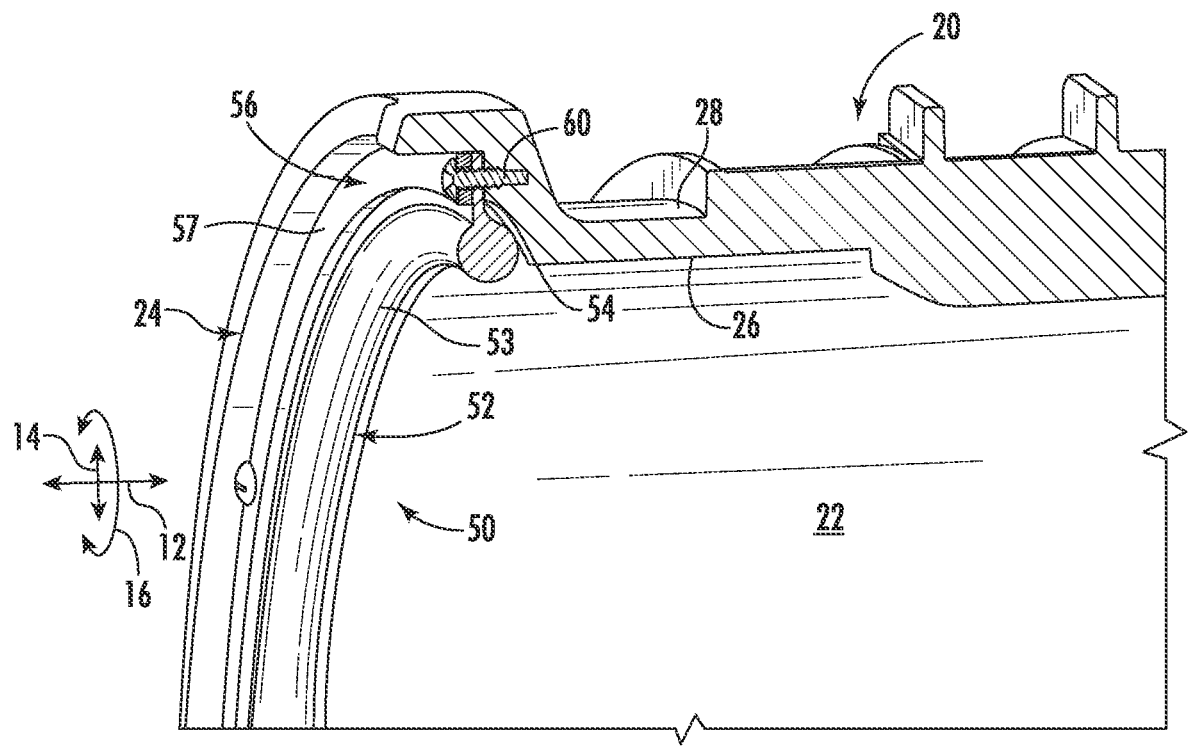
FIG. 19 illustrates a portion of the closure cover and a seal assembly in accordance with other embodiments of the present disclosure.
Figure 20:
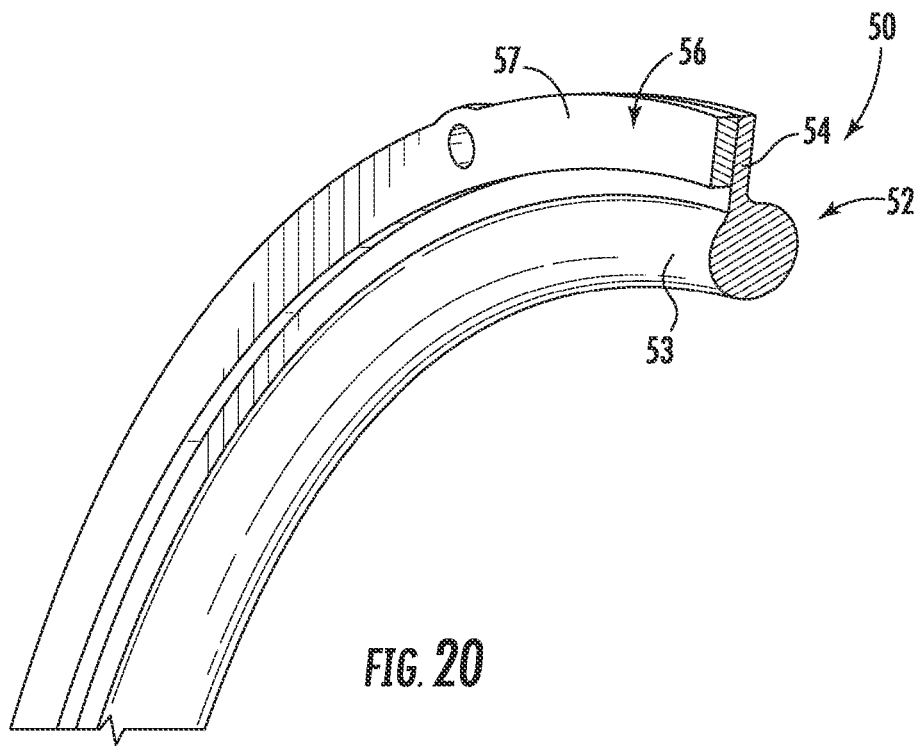
FIG. 20 is a perspective view of a seal assembly in accordance with other embodiments of the present disclosure.
Figure 21:
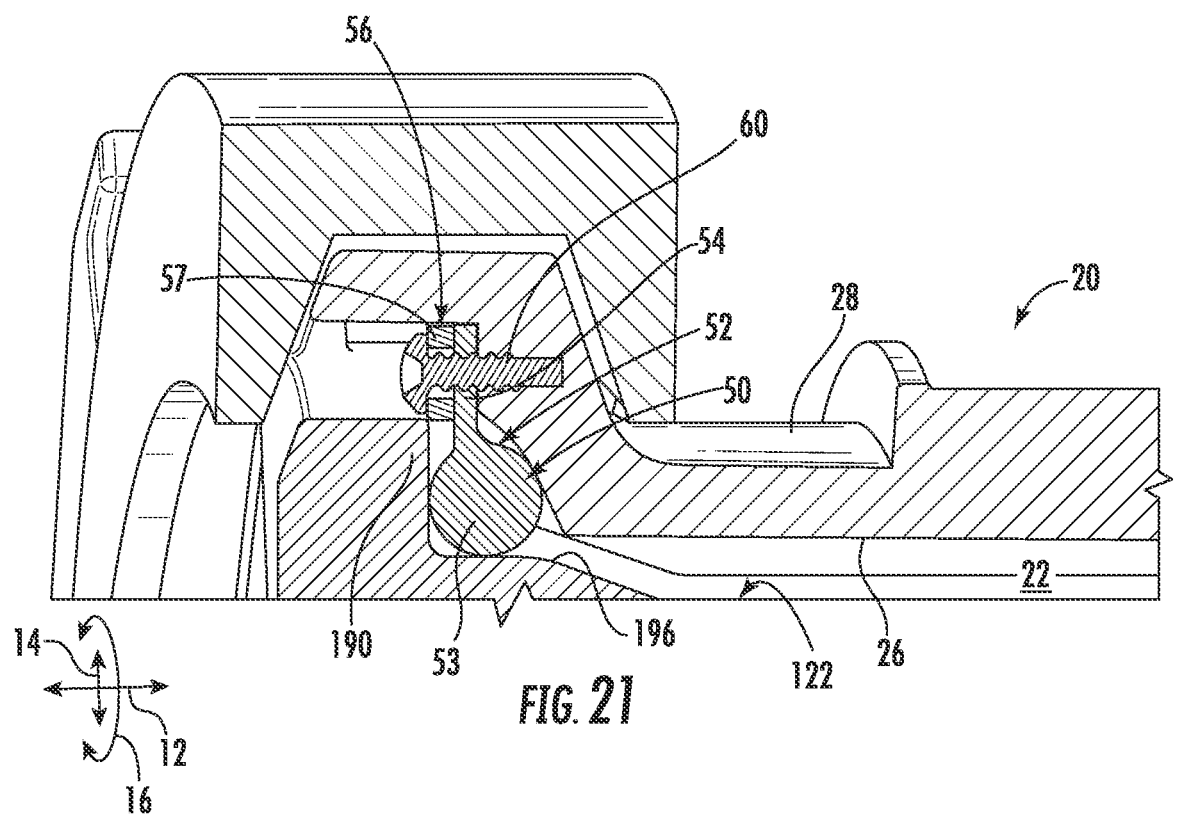
FIG. 21 is a cross-sectional view of a portion of an assembled closure in accordance with embodiments of the present disclosure.

Additionally, improved sealing may be provided between the base 40 and the cover 20. For example, and referring to FIGS. 17 through 21, a seal assembly 50 may be disposed between the cover 20, such as the inner surface 26 thereof, and the base 40. Seal assembly 50 may provide a seal which prevents unwanted materials from entering the interior 22 between the cover 20 and base 40. Seal assembly 50 may be a generally annular assembly which extends generally along the circumferential axis 16, and may include a seal member 52 which includes an O-ring 53 and a tail 54 extending from the O-ring. Seal member 52 may, for example, be formed from a nitrile, natural rubber, or other suitable material. Seal assembly 50 may further include a support member 56. Support member 56 may, for example, be formed from a nylon, another suitable thermoplastic, or other suitable material. In some embodiments, as illustrated in FIGS. 17 and 18, support member 56 may include a ring body 57 and one or more snap members 58 extending from the ring body 57. The seal member 52 may be connected to the support member 56, such as via injection of portions of the tail 54 into openings 59 defined in the ring body 57. In other embodiments, as illustrated in FIGS. 19 through 21, an entire periphery of the ring body 57 may be dual molded/overmolded with the tail 54, such that no injections into openings 59 are necessary.

Seal assembly 50 may advantageously be connected to the cover 20, and may be disposed within the interior 22, as shown. In some embodiments as illustrated in FIGS. 17 and 18, one or more snap members 27 may extend from the inner surface 26 into the interior 22, such as adjacent to the opening 24. The snap members 58 may contact the snap members 27 when the seal assembly 50 is inserted into the cover interior 22 of the cover 20. Specifically, snap members 58 may pass over snap members 27, and then be impeded from passing over snap members 27 in the opposite direction for removal of the seal assembly from the interior 22, due to the at least partially tapered profiles of the snap members 27, 58. In other embodiments, as illustrated in FIGS. 19 through 21, no snap members 27, 58 need be utilized. Instead, mechanical fasteners 60 may extend through the support member 56 (such as the ring body 57 thereof) and the seal member 52 (such as the tail 54 thereof) and into the cover 20 to connect the seal assembly 50 to the cover 20. Accordingly, the seal assembly 50 may advantageously be connected to the cover 20 to provide sealing while also facilitating easy assembly of the closure 10 and reducing the risk of loss of the seal assembly 50.

Figure 2:
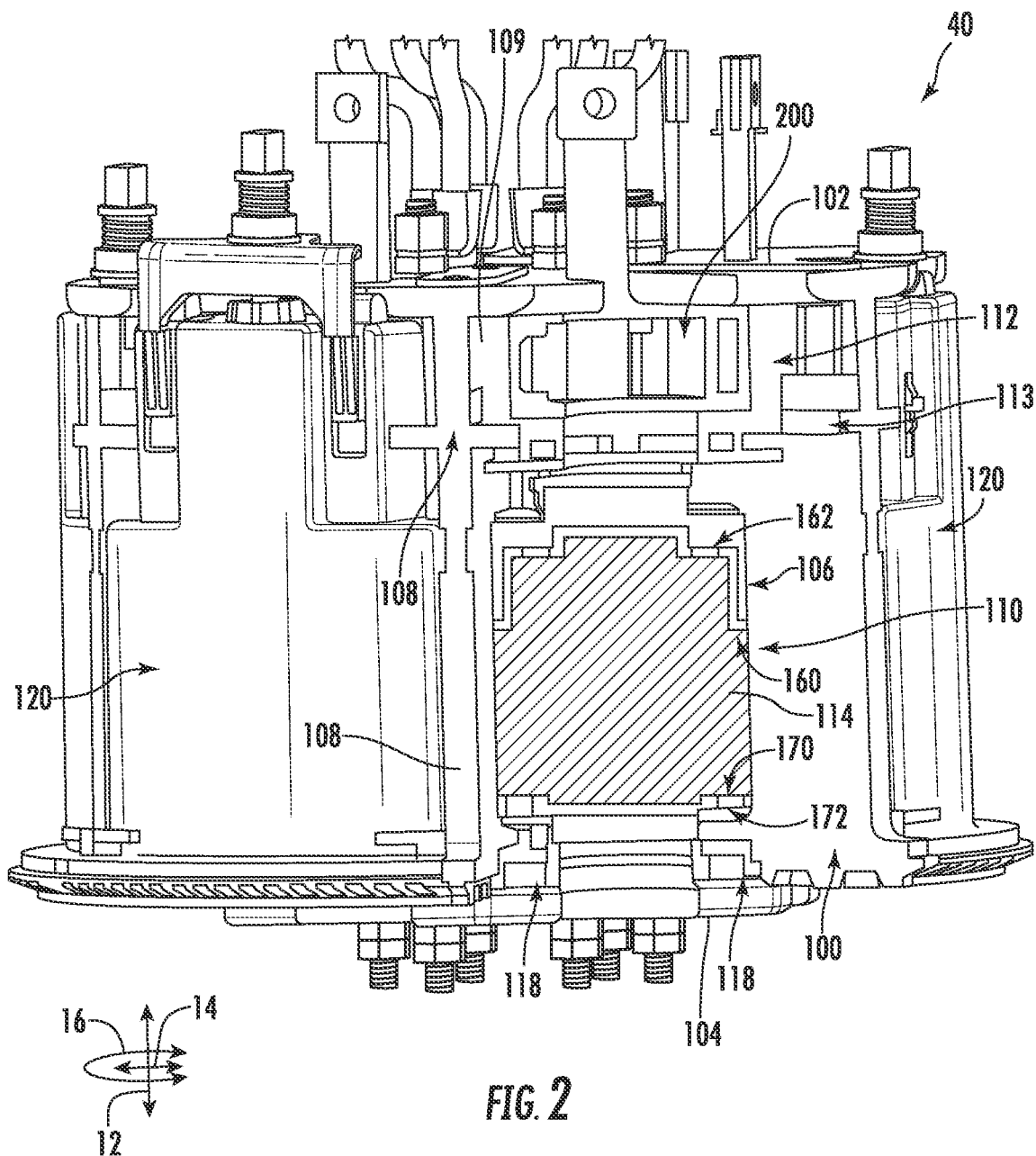
FIG. 2 is a perspective view of a base for a butt closure in accordance with embodiments of the present disclosure.
Figure 3:
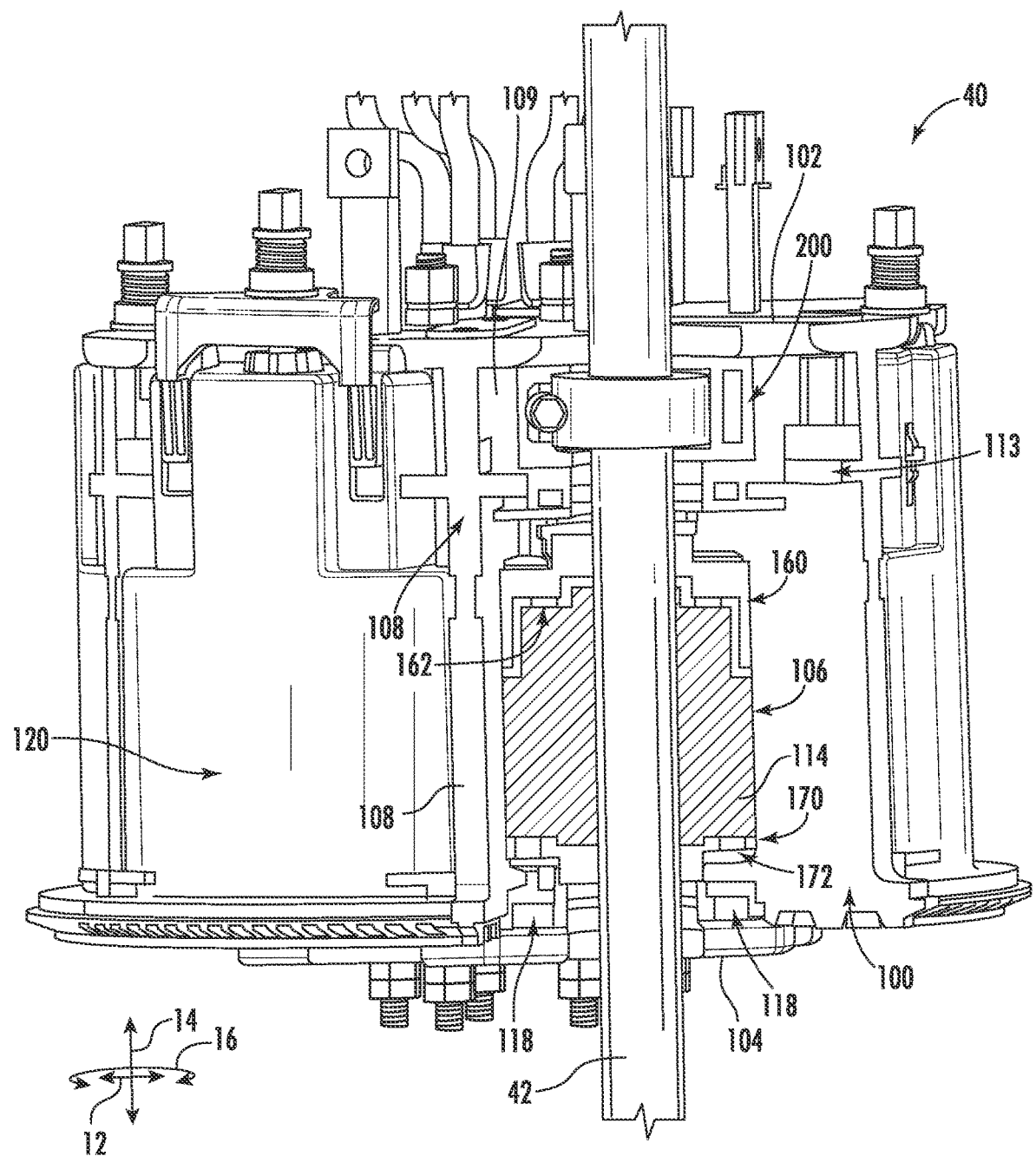
FIG. 3 illustrates the base of FIG. 2 with a cable and cable collar assembly inserted in a cavity thereof.
Figure 4:
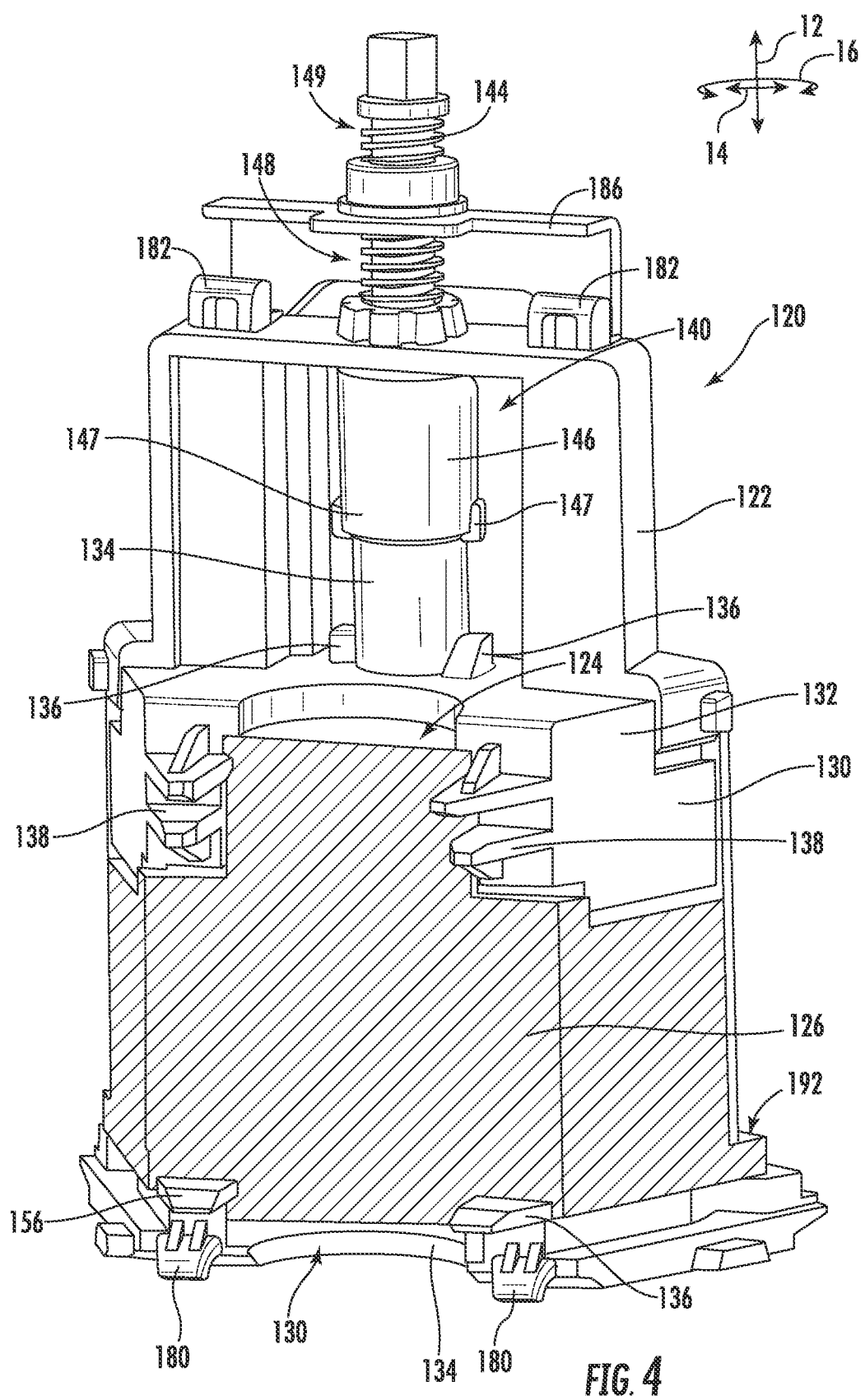
FIG. 4 is a perspective inner view of a wedge assembly in accordance with embodiments of the present disclosure.
Figure 5:
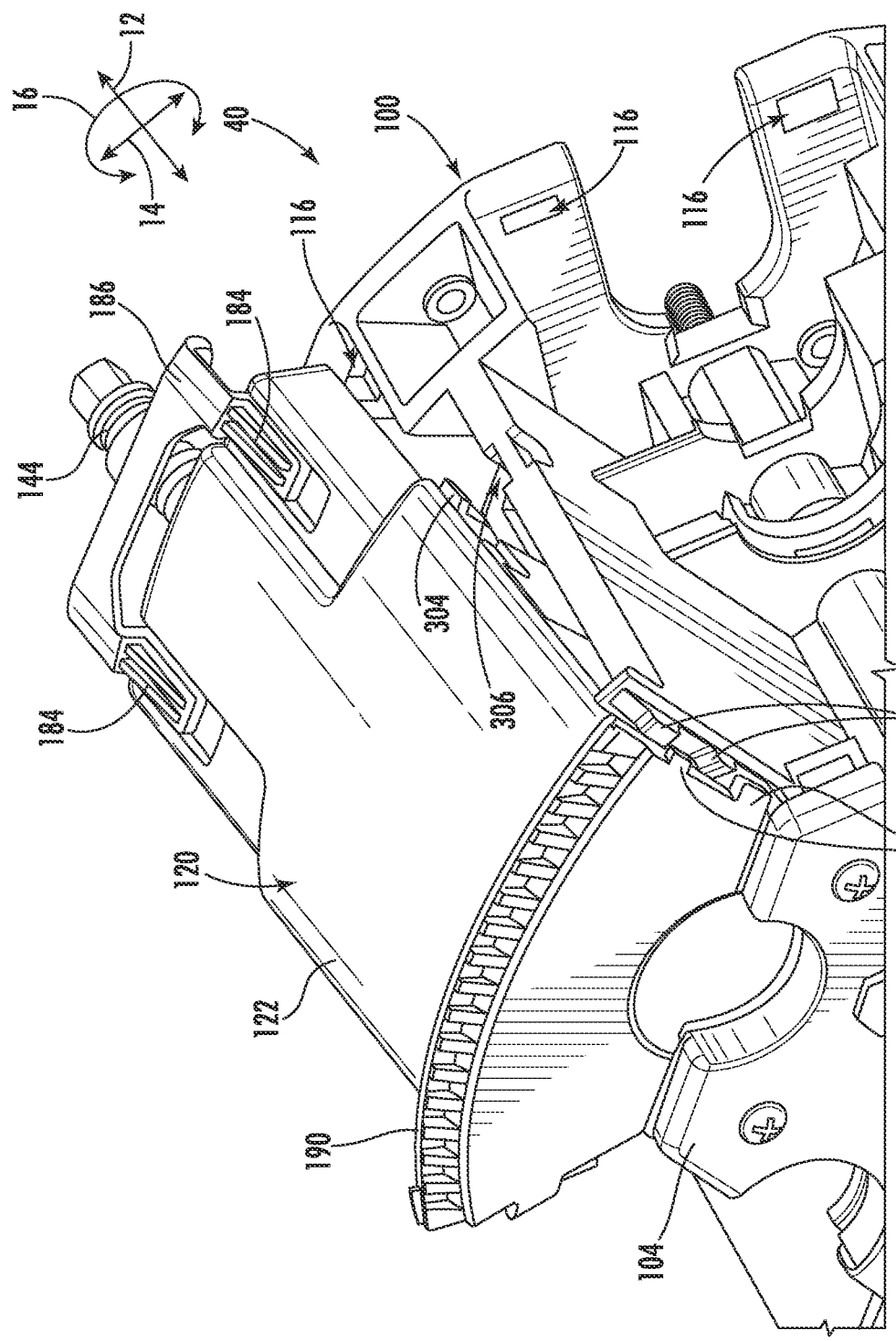
FIG. 5 is a bottom perspective view of a wedge assembly being connected to a base in accordance with embodiments of the present disclosure.
Figure 6:
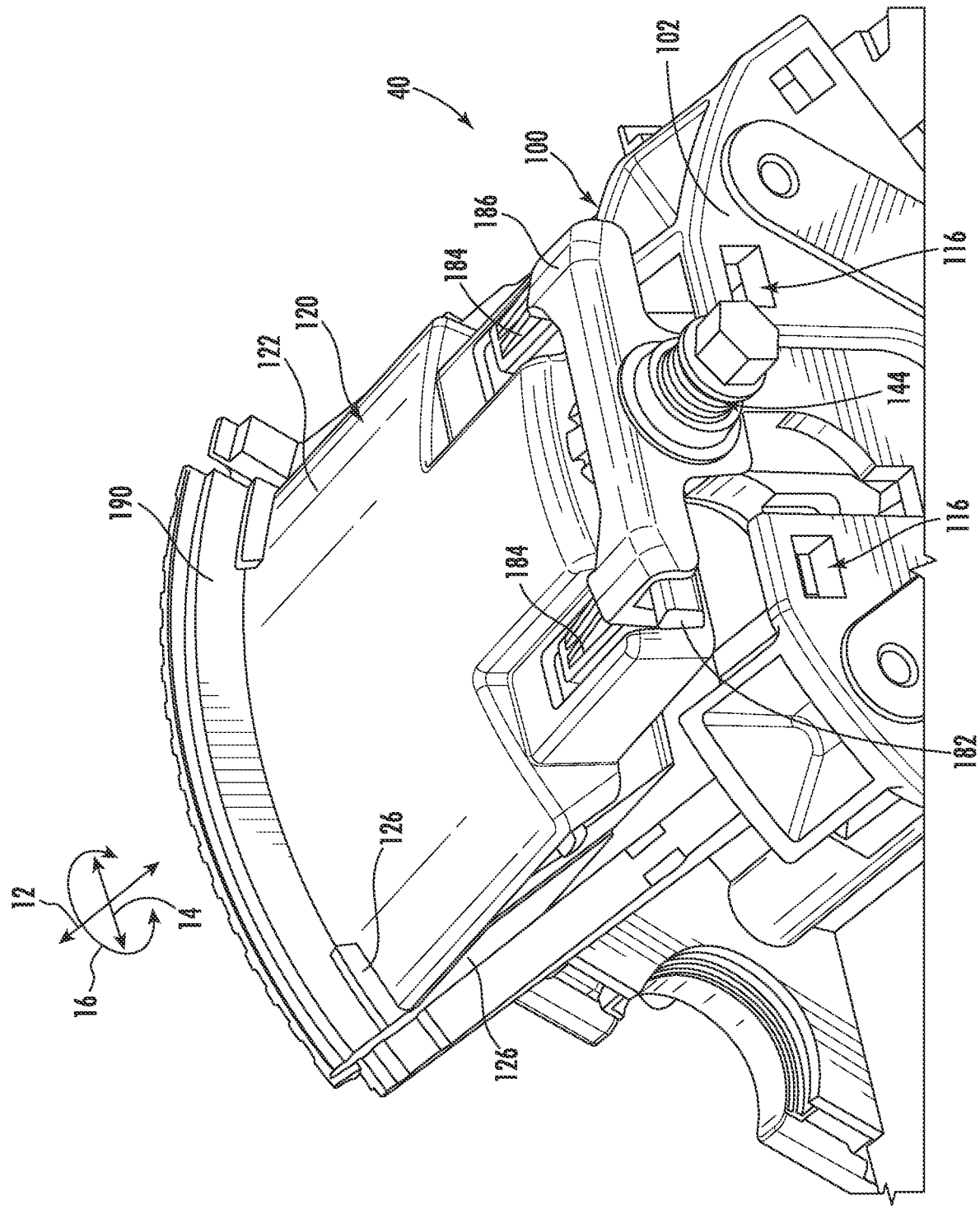
FIG. 6 is a top perspective view of a wedge assembly being connected to a base in accordance with embodiments of the present disclosure.
Figure 7:
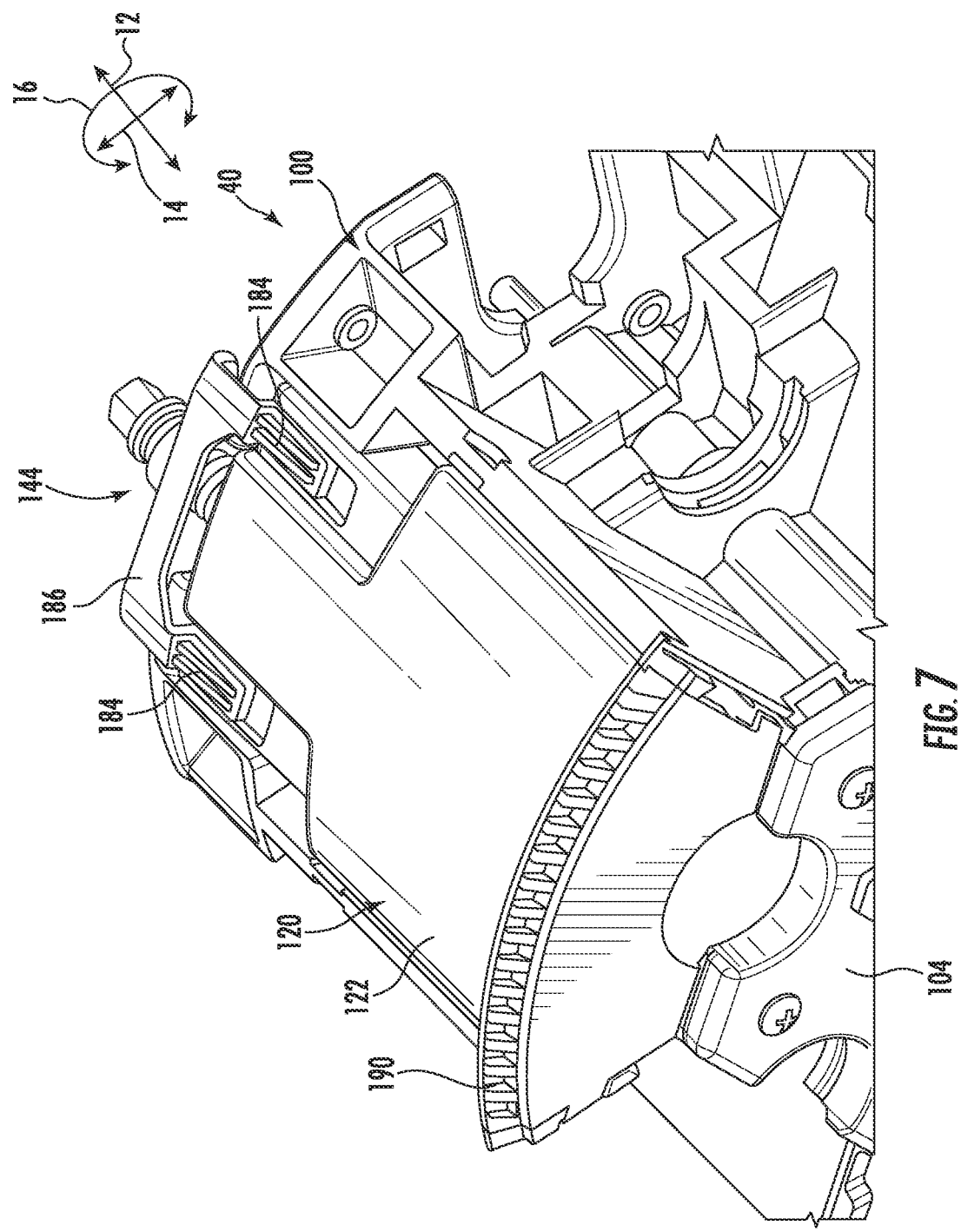
FIG. 7 is a bottom perspective view of a wedge assembly after connection to a base in accordance with embodiments of the present disclosure.

Referring now to FIGS. 2 through 16 and 22, details of bases 40 in accordance with embodiments of the present disclosure are provided. As shown in FIGS. 2 and 3, a base 40 may, for example, include a base housing 100 which extends along the longitudinal axis 12 between a first outer surface 102 and an opposing second outer surface 104. When assembled into a closure 10, the first outer surface 102 may be disposed within the interior 22, and the second outer surface 104 may be within the interior 22 or exterior to the cover 20. Second outer surface 104 may be exposed to the external environment surrounding the closure 10.

Between the first and second outer surfaces 102, 104, a plurality of cavities 106 may be defined in the base 40. The cavities 106 may be aligned in an annular array, such as along the circumferential axis 16. The cavities 106 may be spaced apart by sidewalls 108 which extend along the longitudinal axis 12 between the first and second outer surface 102, 104.

Each cavity 106 is designed to accommodate a cable 42 which extends therethrough, such as along the longitudinal axis 12. Cavity 106 further includes components for facilitating sealing around such cable 42. Further, the base 40 includes various features for connecting wedge assemblies thereto, each wedge assembly being insertable into a cavity 106 such that a cable 42 in a cavity 106 is disposed and sealed between the base housing 100 and a wedge assembly.

For example, each cavity 106 may be subdivided into a sealing portion 110 and a cable retention portion 112. The portions 110, 112 may be spaced apart from each other along the longitudinal axis 12, and may be separated by a partition 113. A first gel 114 may be disposed in each cavity 106, such as in the sealing portion 110. Gel 114 may, for example, be a thermoplastic, such as a thermoplastic elastomer, such as a vulcanized thermoplastic elastomer. When the cable 42 is inserted into the cavity 106, the cable 42 may contact the gel 114 such that the gel 114 partially surrounds a portion of the cable 42.

Figure 22:
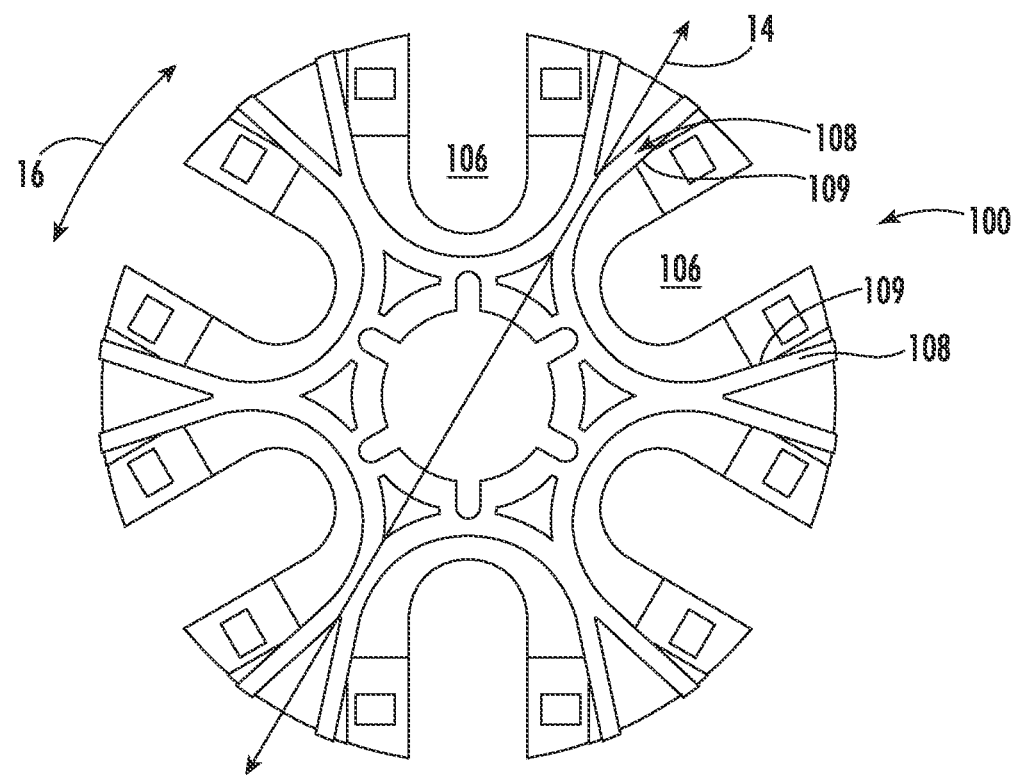
FIG. 22 is a top cross-sectional view of a base housing of a closure in accordance with embodiments of the present disclosure.
Figure 23:
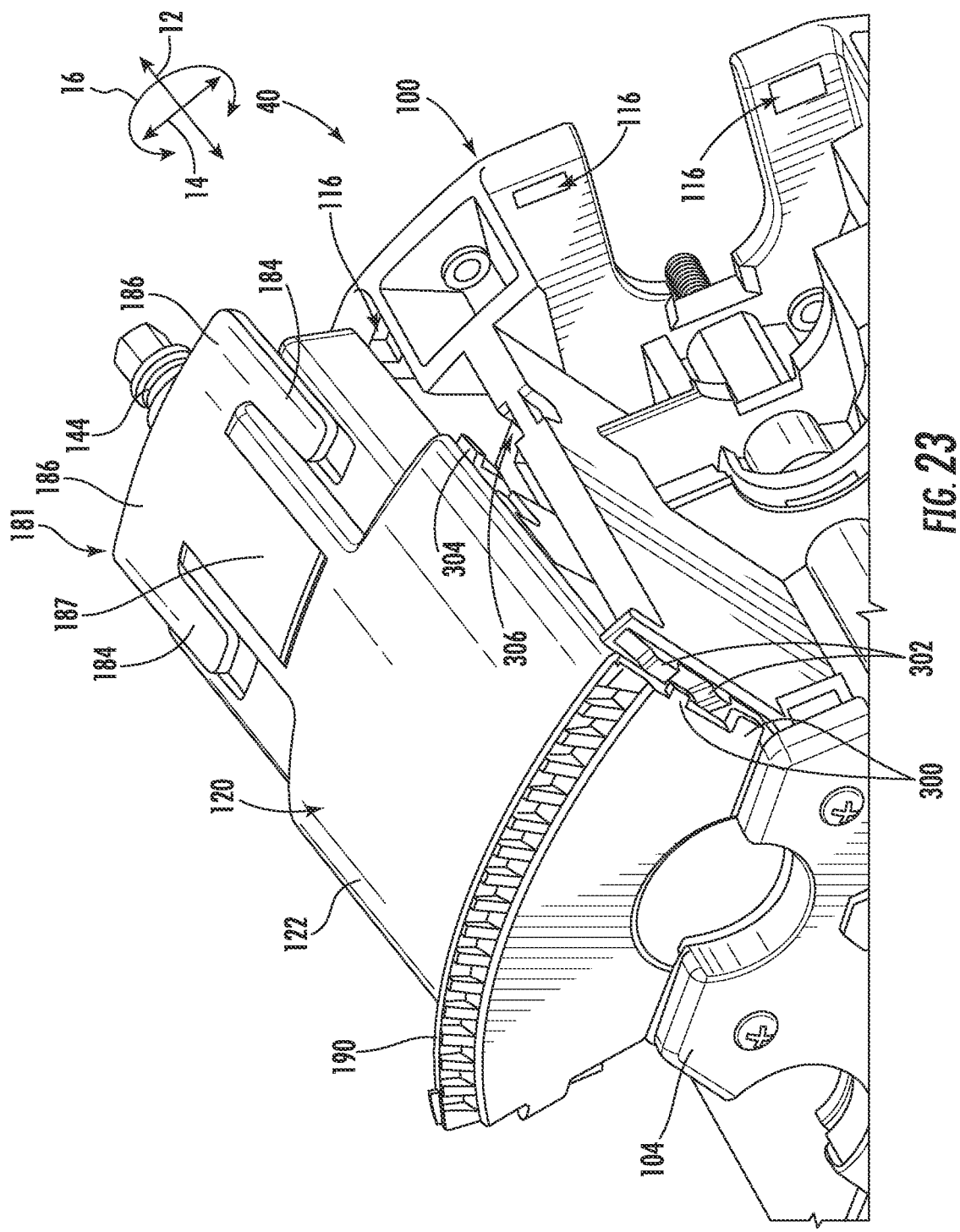
FIG. 23 is a bottom perspective view of a wedge assembly being connected to a base in accordance with other embodiments of the present disclosure.
Figure 24:
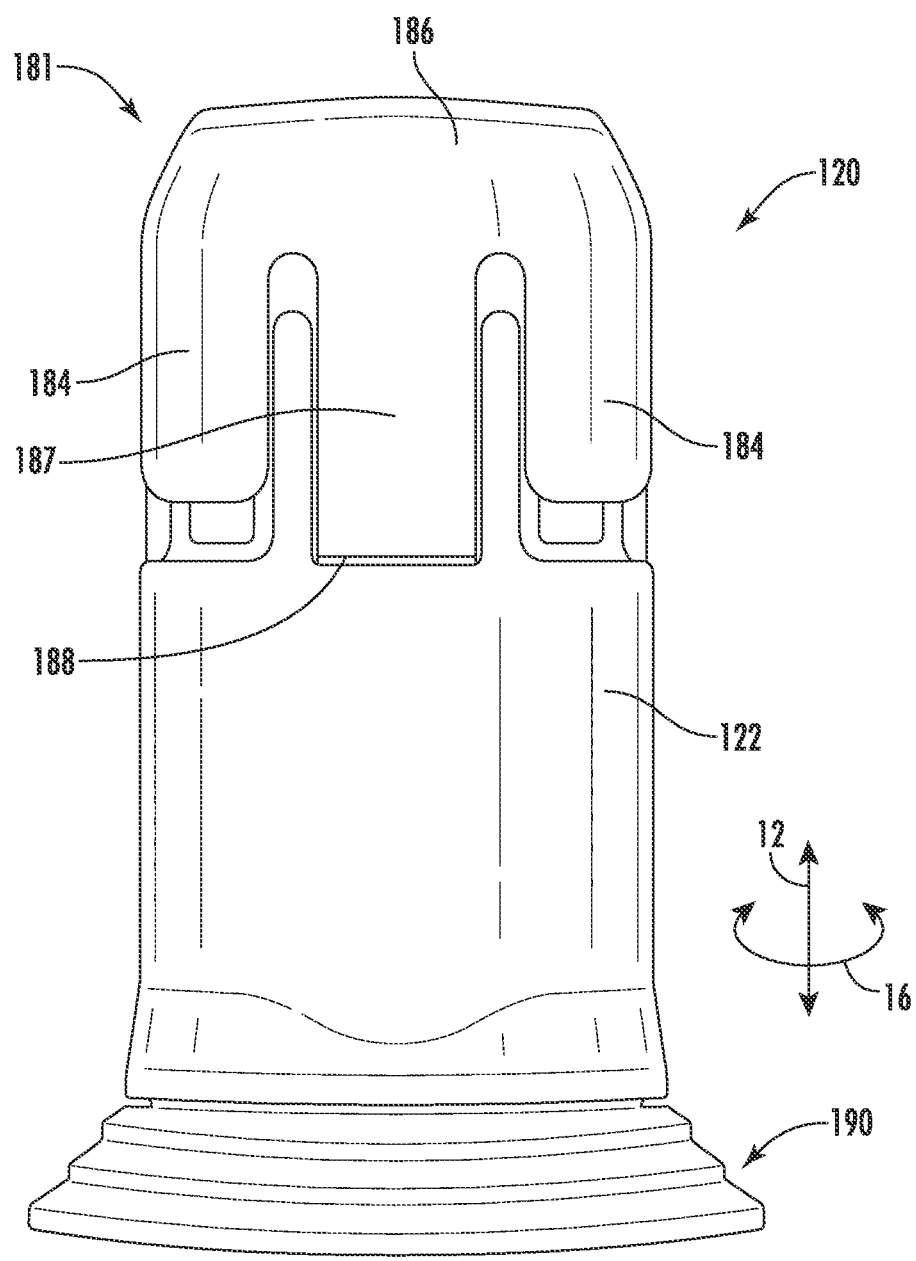
FIG. 24 is a front outer view of a wedge assembly with adjustable tabs in engaged positions in accordance with embodiments of the present disclosure.
Figure 25:
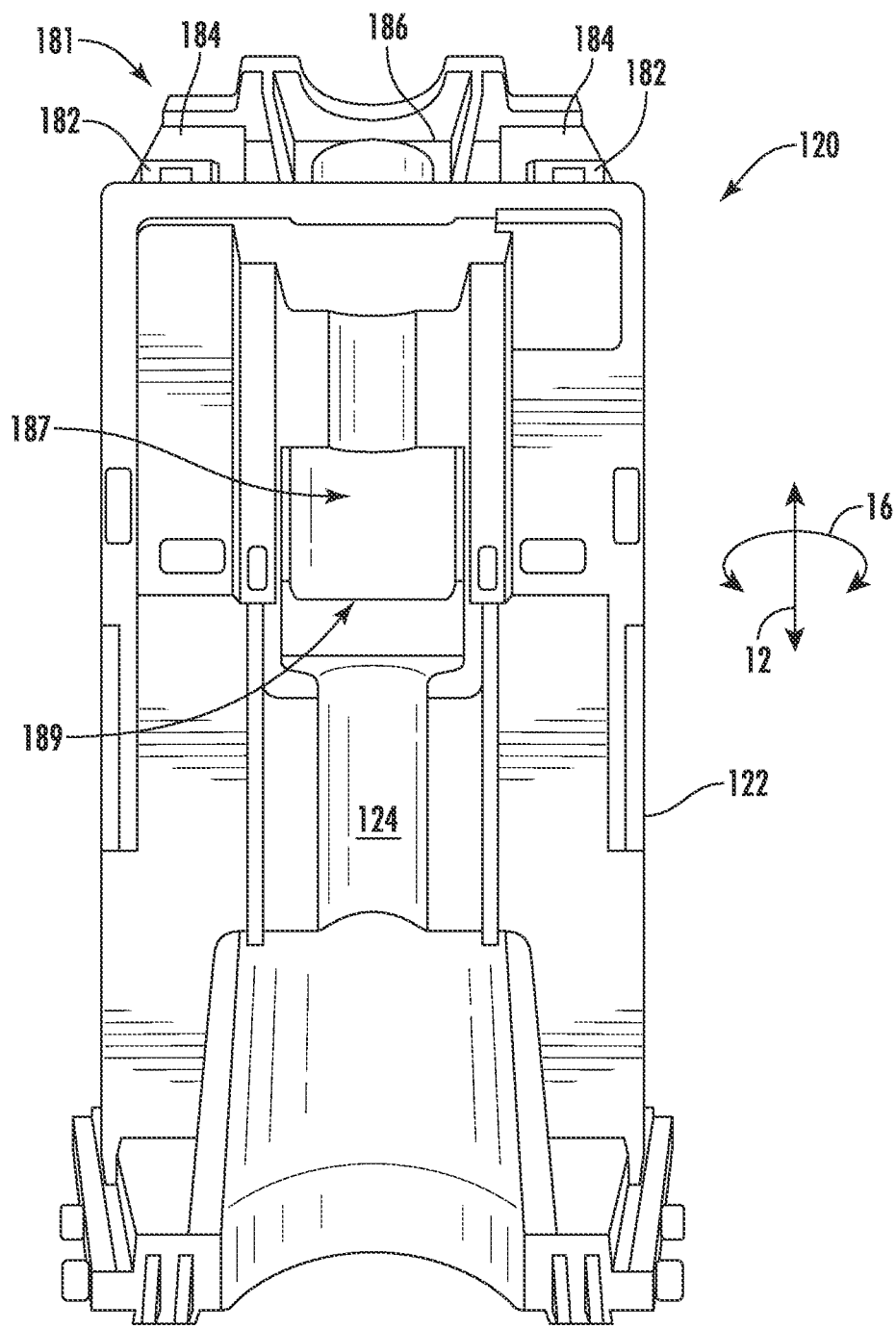
FIG. 25 is a rear inner view of a wedge assembly with adjustable tabs in engaged positions in accordance with embodiments of the present disclosure.
Figure 26:
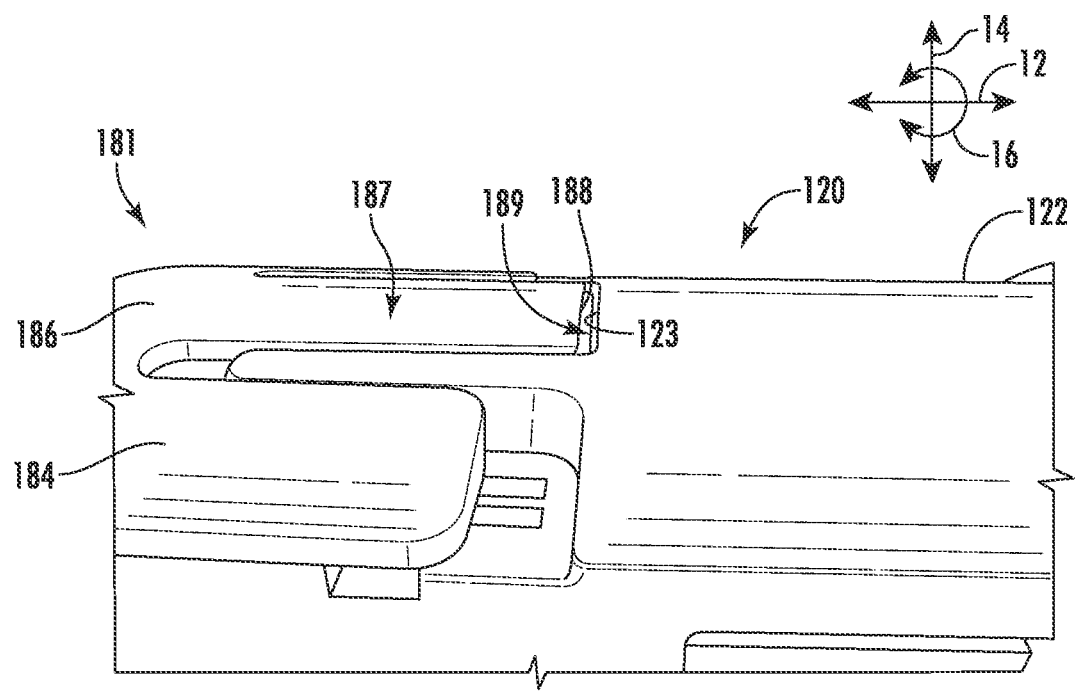
FIG. 26 is a side outer view of a wedge assembly with a stop member in a first position in accordance with embodiments of the present disclosure.

As discussed, each cavity 106 is defined between sidewalls 108. More specifically, each sidewall 108 includes surfaces 109 which define respective cavities 106. In some embodiments, the surfaces 109 of opposing sidewalls 108 which define a cavity 106 may extend substantially radially. Alternatively, in exemplary embodiments as shown in FIG. 22, the surfaces 109 of opposing sidewalls 108 which define a cavity 106 may extend substantially parallel to each other and thus not substantially radially. As utilized herein, the term substantially means within plus-or-minus 15 degrees. The use of substantially parallel surfaces 109 is particularly advantageous, especially relative to substantially radially extending surfaces 109, as the use of substantially parallel surfaces 109 strengthens the sidewalls 108 and base housing 100 generally and provides improved locating, loading, and sealing of wedge assemblies with the base housing 100 to form the base 40.

Additionally, one or more slots 116 may be defined in the base housing 100 adjacent each cavity 106, such as through and/or adjacent the first outer surface 102. Further, one or more passages 118 may be defined in the base housing 100 adjacent each cavity, such as through and/or adjacent the second outer surface 104. The slots 116 and passages 118 may facilitate the connection of wedge assemblies to the base housing 100, as discussed herein.

As discussed, and referring now to FIGS. 2 through 16, base 40 may further include a plurality of wedge assemblies 120. Each wedge assembly 120 is removably insertable into one of the plurality of cavities 106 and removably connectable to the base housing 100. When inserted and connected, a cable 42 may be sealed within a cavity 106 between the base housing 100 and a wedge assembly 120.

Each wedge assembly 120 may include an outer cover 122 which defines a wedge interior 124. A second gel 126 may be disposed in the wedge interior 124. Gel 126 may, for example, be a thermoplastic, such as a thermoplastic elastomer, such as a vulcanized thermoplastic elastomer. When the wedge assembly 120 is inserted and connected, the interior 124 may face and be disposed within the cavity 106. When the cable 42 is inserted into the cavity 106, the gel 126 may partially surround a portion of the cable 42. The first and second gels 114, 126 may together fully surround a portion of the cable 42, in particular when one or both gels is compressed as discussed herein.

Each wedge assembly 120 may further include a main pressure plate 130. The main pressure plate 130 may be in contact with the second gel 126, and may be movable along the longitudinal axis 12 to selectively apply pressure to or remove pressure from the second gel 126. As such pressure is applied to the second gel 126, the gel may move around the cable 42 to more fully surround the cable 42 and may provide a seal around the cable 42.

Main pressure plate 130 may include a main body 132 which contacts the second gel 126. Further, in exemplary embodiments, an inner spring housing 134 may extend from the second gel 126. Additionally, one or more stops 136 may be provided on the main body 132, such as adjacent the inner spring housing 134. Additionally, one or more stops 137 may be provided in the interior 124, such as extending from an interior wall defining the interior 124.

Figure 9:
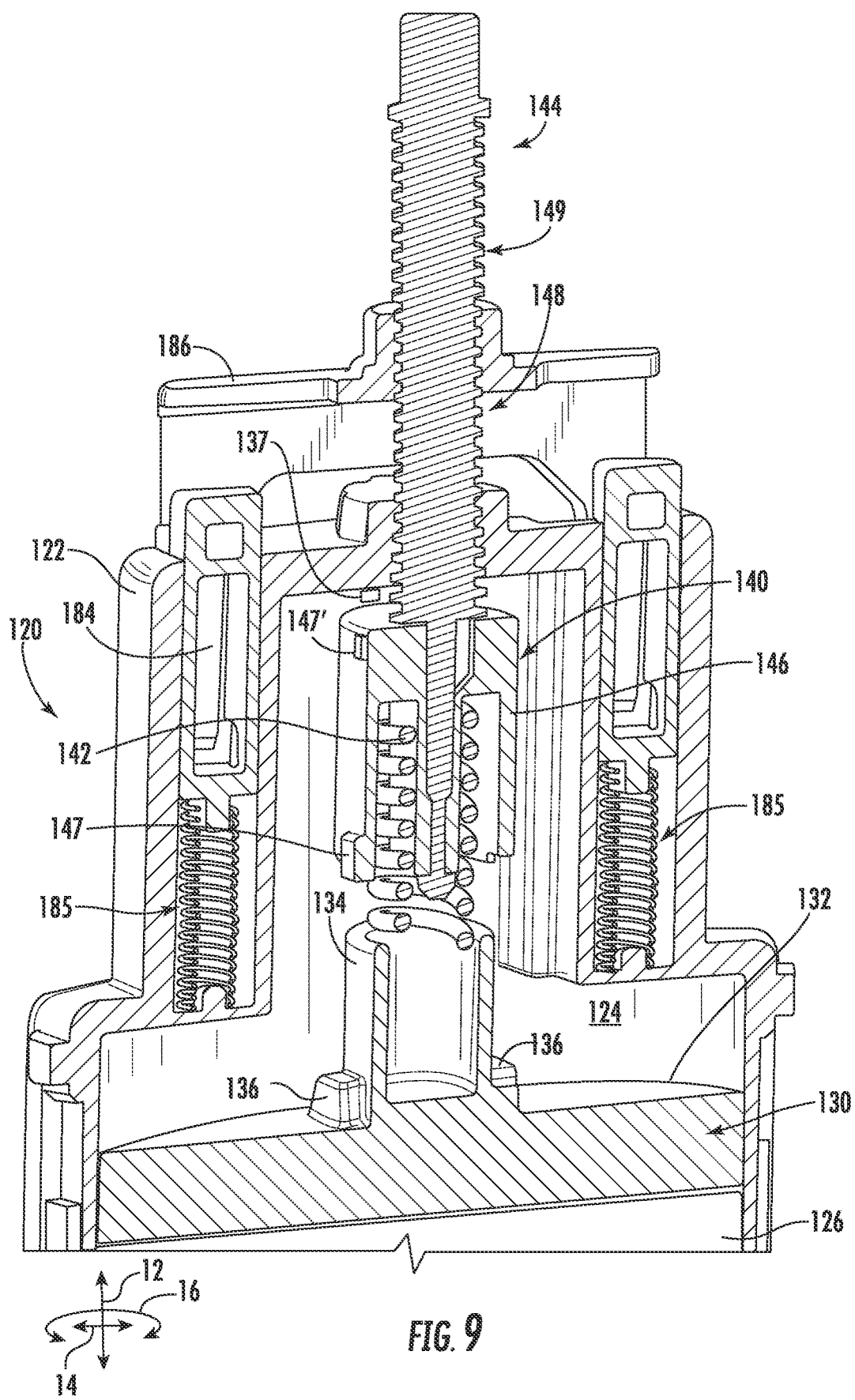
FIG. 9 is a cross-sectional view of a wedge assembly illustrating a compression assembly in a non-compressed position in accordance with embodiments of the present disclosure.
Figure 10:
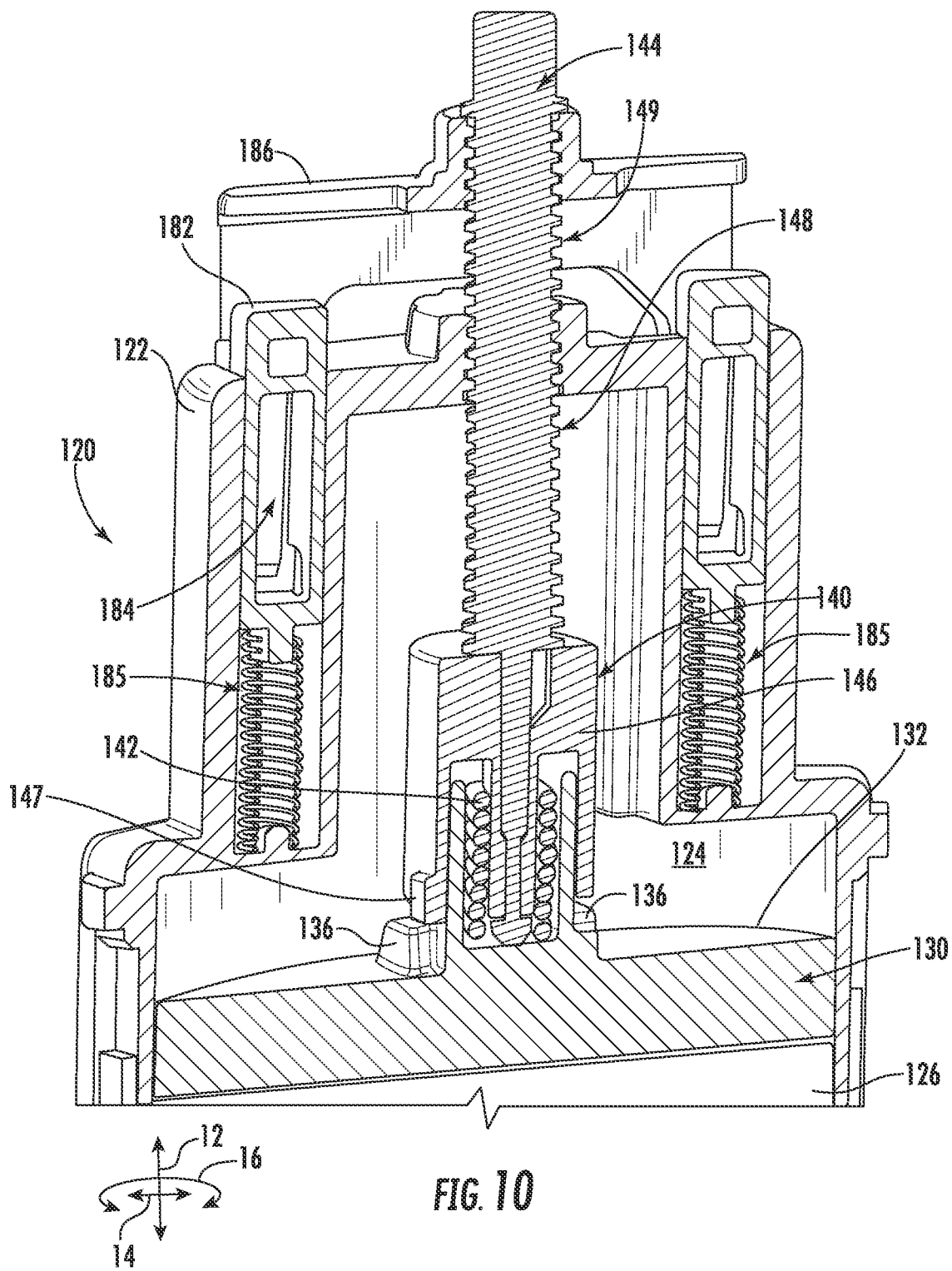
FIG. 10 is a cross-sectional view of a wedge assembly illustrating a compression assembly in a compressed position in accordance with embodiments of the present disclosure.
Figure 11:
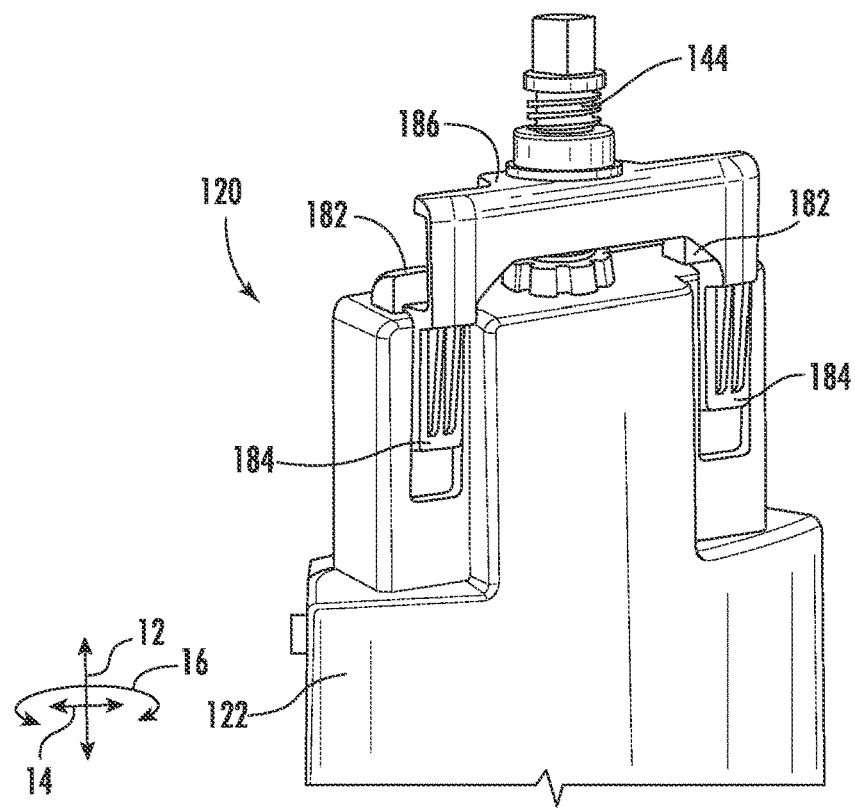
FIG. 11 is a perspective outer view of a portion of a wedge assembly with adjustable tabs in engaged positions in accordance with embodiments of the present disclosure.
Figure 12:
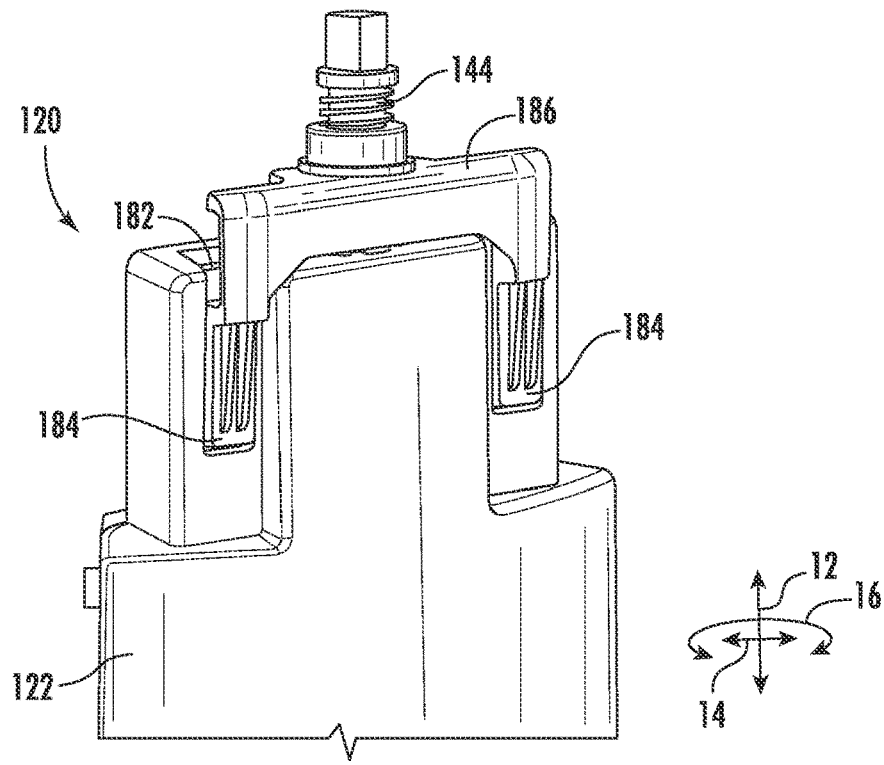
FIG. 12 is a perspective outer view of a portion of a wedge assembly with adjustable tabs in disengaged positions in accordance with embodiments of the present disclosure.

In exemplary embodiments, a compression assembly 140 may be operable to move the main pressure plate 130. Compression assembly 140 may interact with the inner spring housing 134 and/or stops 136, 137 to cause such movement. For example, compression assembly 140 includes a compression spring 142, an actuator 144 (which may for example be a screw as shown or a bolt), and an outer spring housing 146. The compression spring 142 may be disposed within the outer spring housing 146 and inner spring housing 134. The outer spring housing 146 may be connected to the actuator 144. Actuator 144 may extend from the wedge interior 124 through the outer cover 122 to exterior to the wedge assembly 120, such that the actuator 144 is accessible after the wedge assembly 120 is connected to the base housing 100. As illustrated in FIGS. 9 and 10, actuator 144 may be adjustable along the longitudinal axis 12 relative to the outer cover 122. Such adjustment may cause movement of the main pressure plate 130 along the longitudinal axis 12, which in turn may cause pressurization or depressurization of the second gel 126.

Adjustment of the actuator 144 may be a direct linear adjustment, or may be a linear adjustment caused by rotation thereof, such as in embodiments wherein the actuator 144 is a screw or bolt. When the actuator 144 is moved, this movement may also cause movement of the outer spring housing 146, which may compress or decompress the spring 142 along the longitudinal axis 12. During compression, the outer spring housing 146 may overlap and cover the inner spring housing 134. In some embodiments, tabs 147 and/or 147' may extend from outer spring housing 146. As the outer spring housing 146 overlaps the inner spring housing 134, tabs 147 may contact stops 136, thus limiting the amount of compression of the gel 126 that can occur. During decompression, tabs 147' may contact stops 137, thus limiting the amount of decompression of the gel 126 that can occur and/or limiting the movement of the actuator 144. For example, tabs 147' may prevent movement of housing 146 past tabs 147', thus defining an uppermost position of the housing 146, via interaction with stops 137. This in turn may prevent further movement of the actuator 144, specifically preventing the actuator 144 from backing out of the wedge assembly 120.

In some embodiment as shown, the actuator 144 may be a screw and thus include screw thread(s). Further, in some exemplary embodiments, the screw thread(s) may include a first portion 148 having a first outer diameter and a second portion 149 having a second outer diameter which is different from the first outer diameter. The first portion 148 may be proximate the gel 126 relative to the second portion 149, and the second portion 149 thus distal from the gel 126 relative to the first portion 148, along the longitudinal axis 12. In exemplary embodiments, the second outer diameter is greater than the first outer diameter. As such, when the actuator 144 is being actuated along the longitudinal axis 12 during compression, the an interference fit may occur between the second portion 149 and the outer cover 122 as the second portion 149 comes into contact with the outer cover 122 (such as mating thread(s) thereof), thus further securing the compression assembly 140 and gel 126 in a sealed, compressed position.

The use of compression assemblies 140 in accordance with the present disclosure is particularly advantageous, as the construction and operation of such compression assemblies 140 ensures a generally consistent pressure is applied to the gel 126 regardless of the size of the cable 42 that the gel 126 surrounds. This is due at least in part to the use of a compression spring 142, as well as the housings 146, 134 and other various components.

In some embodiments, each wedge assembly 120 may further include a main equalization plate 150. The main equalization plate 150 may be in contact with the second gel 126, and may be movable along the longitudinal axis 12 to selectively apply pressure to or remove pressure from the second gel 126. As such pressure is applied to the second gel 126, the gel may move around the cable 42 to more fully surround the cable 42 and may provide a seal around the cable 42. The main equalization plate 150 may be positioned opposite the main pressure plate 130 along the longitudinal axis 12 relative to the second gel 126, such that the second gel 126 is disposed between the main pressure plate 130 and main equalization plate 150 along the longitudinal axis 12.

Figure 8:
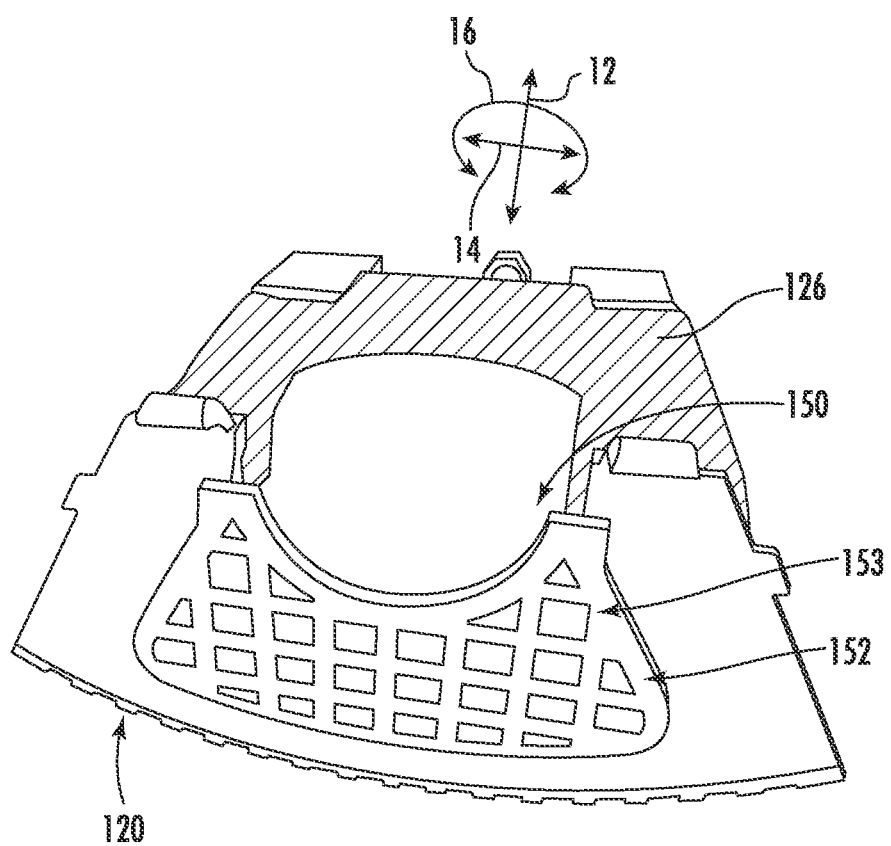
FIG. 8 is a bottom perspective view of a wedge assembly, illustrating movement of a main equalization plate thereof, in accordance with embodiments of the present disclosure.

Main equalization plate 150 in exemplary embodiments is exposed to external environmental pressure exterior to the closure 10. For example, in some embodiments as illustrated in FIG. 8, a portion of the base housing 100 and second outer surface 104 may be in the form of a grate 152. Apertures 153 in the grate 152 may expose the main equalization plate 150 to the external environmental pressure. The external environmental pressure may cause movement of the main equalization plate 150. For example, as the pressure increases, such as when the closure 10 is being provided into a liquid environment, such pressure may act on the main equalization plate 150. This pressure may cause movement of the main equalization plate 150, such as along the longitudinal axis 12, which in turn may cause the main equalization plate 150 to exert pressure on the second gel 126.

In some embodiments, movement of the main pressure plate 130 and/or main equalization plate 150 may further indirectly cause an application of pressure to the first gel 114. For example, the base housing 100 may further include a plurality of auxiliary pressure plates 160. Each pressure plate 160 may be disposed in a cavity 106, and may be in contact with the first gel 114 disposed in that cavity 106. An auxiliary pressure plate 160 may be movable along the longitudinal axis 12 to selectively apply pressure to or remove pressure from the first gel 114. As such pressure is applied to the first gel 114, the gel may move around the cable 42 to more fully surround the cable 42 and provide a seal around the cable 42.

Movement of an auxiliary pressure plate 160 may be caused by movement of an associated main pressure plate 130 which extends into the cavity 106 in which the auxiliary pressure plate 160 is disposed. For example, each main pressure plate 130 may further include one or more fingers 138 which extend from the main body 132 thereof. Each finger 138 may be insertable into a slot 162 defined in the associated auxiliary pressure plate 160 or may otherwise contact the auxiliary pressure plate 160. The fingers 138 may thus link the plates 130, 160 such that movement of the plate 130 causes movement of the plate 160.

Additionally or alternatively, the base housing 100 may further include a plurality of auxiliary equalization plates 170. Each equalization plate 170 may be disposed in a cavity 106, and may be in contact with the first gel 114 disposed in that cavity 106. An auxiliary equalization plate 170 may be movable along the longitudinal axis 12 to selectively apply pressure to or remove pressure from the first gel 114. As such pressure is applied to the first gel 114, the gel may move around the cable 42 to more fully surround the cable 42 and provide a seal around the cable 42. The auxiliary equalization plate 170 may be positioned opposite the auxiliary pressure plate 160 along the longitudinal axis 12 relative to the first gel 114, such that the first gel 114 is disposed between the auxiliary pressure plate 160 and auxiliary equalization plate 170 along the longitudinal axis 12.

Movement of an auxiliary equalization plate 170 may be caused by movement of an associated main equalization plate 150 which extends into the cavity 106 in which the auxiliary equalization plate 170 is disposed. For example, each main equalization plate 150 may further include one or more fingers 156 which extend from a main body 154 thereof. Each finger 156 may be insertable into a slot 172 defined in the associated auxiliary equalization plate 170 or may otherwise contact the auxiliary equalization plate 170. The fingers 156 may link the plates 150, 170 such that movement of the plate 150 causes movement of the plate 170.

Referring now to FIGS. 2 through 7, 11 through 12, and 23 through 32, each wedge assembly 120 is connectable to the base housing 100. For example, as discussed, slots 116 and passages 118 are defined in the base housing 100. Each wedge assembly 120 may include one or more hooks 180, each of which is insertable into an associated passage 118. Further, each wedge assembly 120 may include a latch assembly 181. Latch assembly 181 may include one or more adjustable tabs 182, and may further include one or more latches 184. Each latch 184 may be connected to an associated tab 182. Each tab 182 may be insertable into an associated slot 116. A latch 184, which may for example be a spring-loaded latch which includes a spring 185 (e.g. a compression spring), may be operable to adjust the tab 182, such as between an engaged position and a disengaged position. In the engaged position, the tab 182 may be insertable and then disposed within an associated slot 116 to connect the wedge assembly 120 to the base housing 100. The tab 182 in the engaged position may for example protrude from the outer cover 122 such as along the longitudinal axis 12. In the disengaged position, the tab 182 may be removable from the associated slot 116. The tab 182 in the disengaged position may for example not protrude from the outer cover 122 or may protrude less than in the engaged position. In other words, the tab 182 may be retracted in the disengaged position relative to in the engaged position.

In some embodiments, latch assembly 181 may further include a bridge 186. Bridge 186 may connect and extend between the latches 184 and/or tabs 182, such that the latches 184 and/or tabs 182 can advantageously be operated simultaneously. The bridge 186 may further advantageously add stability to the wedge assembly 120 generally.

To operate the latch assembly 181, the latch(es) 184 and/or bridge 186 may be actuated by a user, such as by the user applying pressure on the latch(es) 184 and/or bridge 186 such as along the longitudinal axis 12. Such pressure may cause movement of the latch(es) 184 and/or bridge 186, and thus cause movement of the tabs 182 from the engaged position to the disengaged position. Once the tabs 182 have been moved from the engaged position to the disengaged position, the wedge assembly 120 can be moved between a connected or disconnected position relative to the base housing 100. The latch(es) 184 and/or bridge 186 may then be released by the user, such that the tabs 182 move (such as via a spring-bias force from the latches 184 and springs 185 thereof) from the disengaged position to the engaged position. When the wedge assembly 120 is in the connected position relative to the base housing 100, such movement may cause the tabs 182 to be inserted and thus disposed within the associated slots 116 to connect the wedge assembly 120 to the base housing 100, as discussed above.

When a wedge assembly 120 is connected to the base housing 100, locking features may reduce or prevent movement of the wedge assembly 120 in various directions, such as along the radial axis 14 and/or along the longitudinal axis 12. For example, tabs 300 on the wedge assembly 120 may interlock with tabs 302 on the base housing 100, such as on the sidewalls 108 (such as bottom surfaces thereof) to reduce or prevent movement along the radial axis 14. Tabs 304 on the wedge assembly 120 may be inserted in slots 306 on the base housing, such as on the sidewalls 108, to reduce or prevent movement along the longitudinal axis 12. Alternatively, interlocking tabs may be utilized to reduce/prevent movement along the longitudinal axis 12 and/or tabs and slots may be utilized to reduce or prevent movement along the radial axis 14, and/or other suitable locking features may be utilized.

Figure 27:
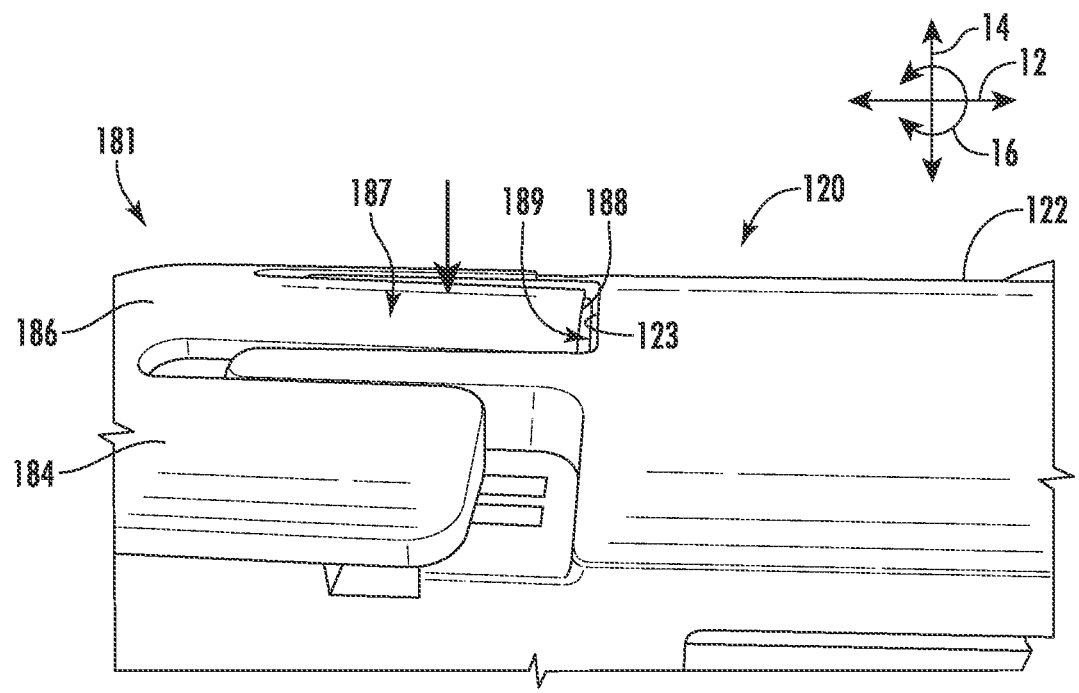
FIG. 27 is a side outer view of a wedge assembly with a stop member in a second position in accordance with embodiments of the present disclosure.
Figure 28:
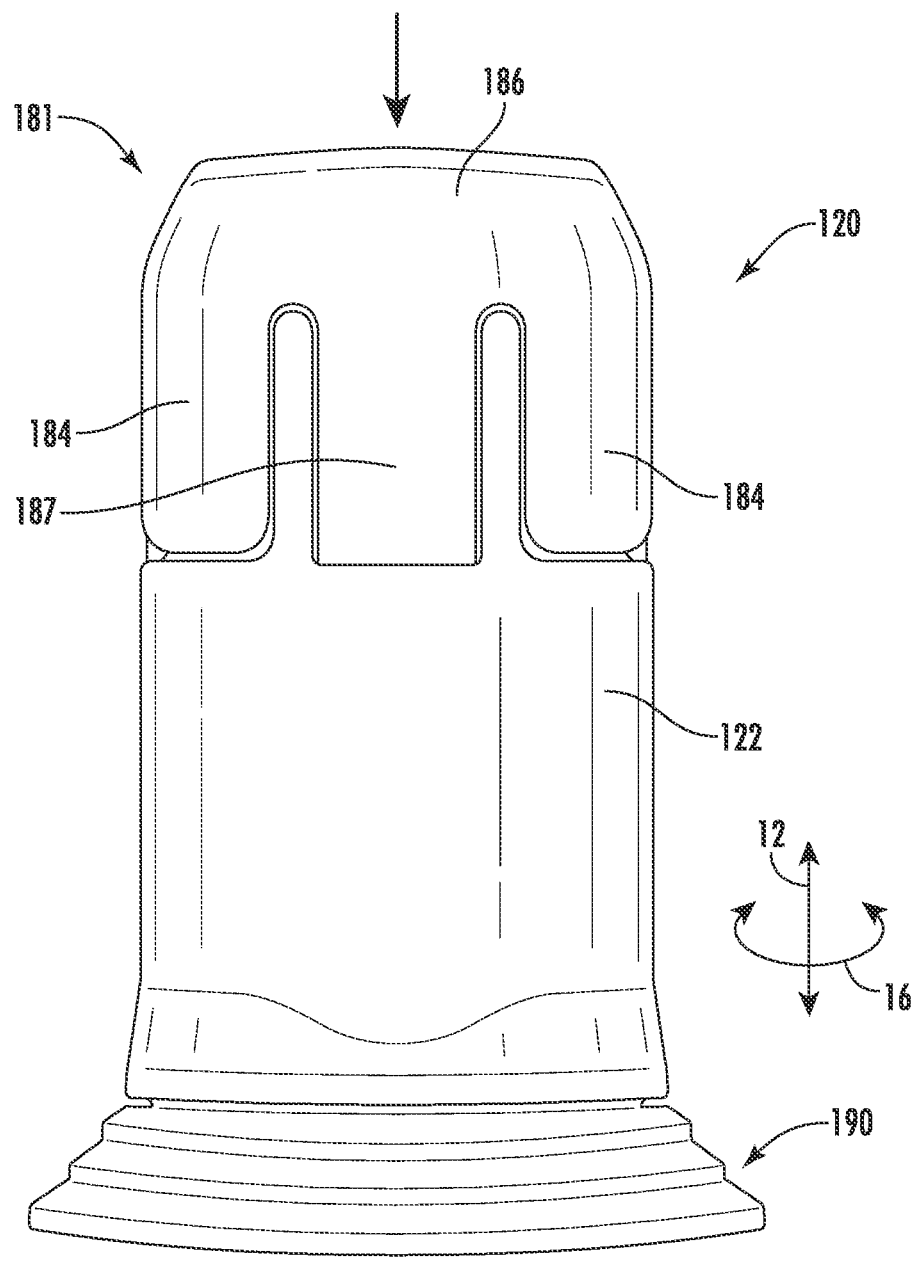
FIG. 28 is a front outer view of a wedge assembly with adjustable tabs in disengaged positions in accordance with embodiments of the present disclosure.
Figure 29:
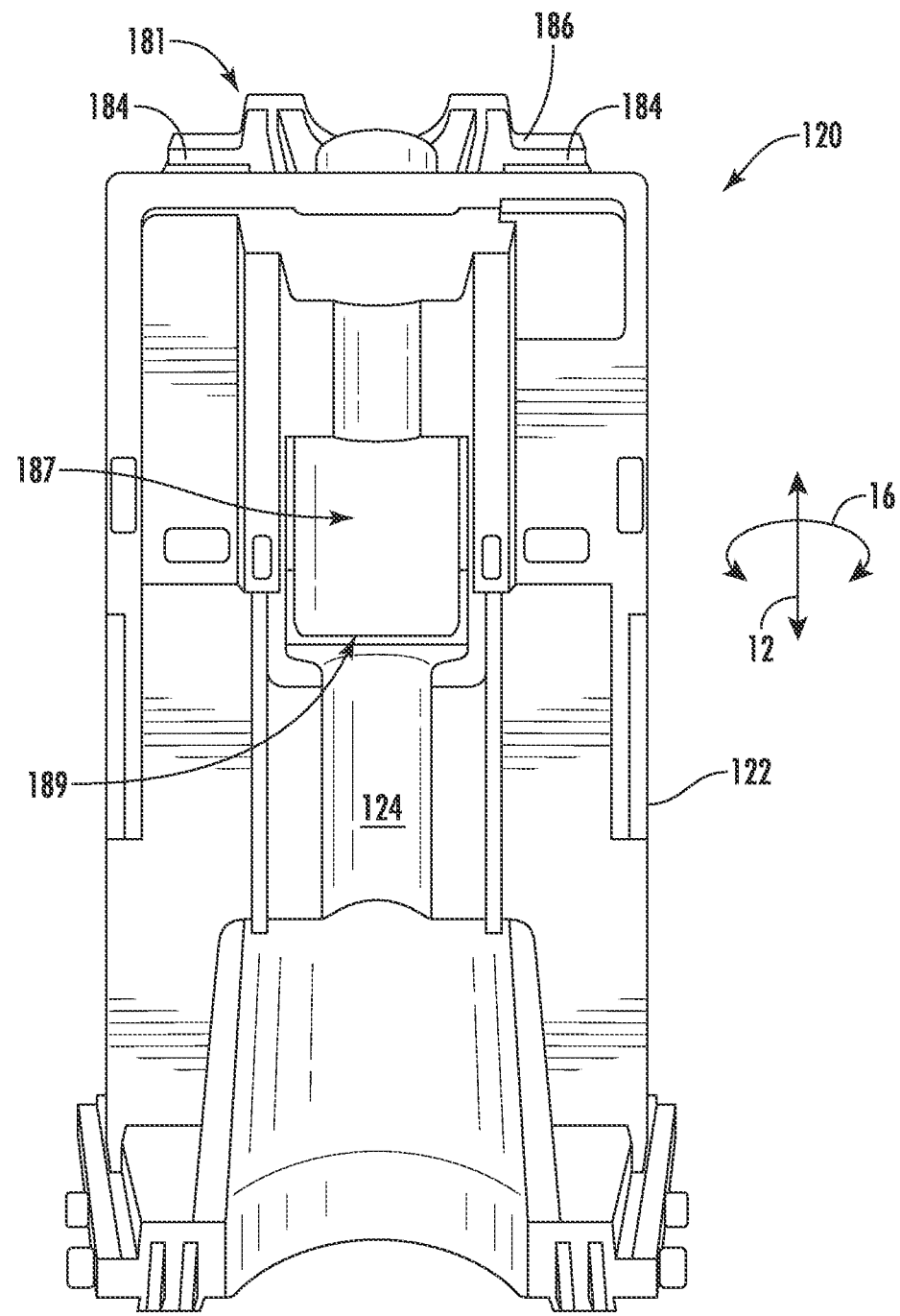
FIG. 29 is a rear inner view of a wedge assembly with adjustable tabs in disengaged positions in accordance with embodiments of the present disclosure.
Figure 30:
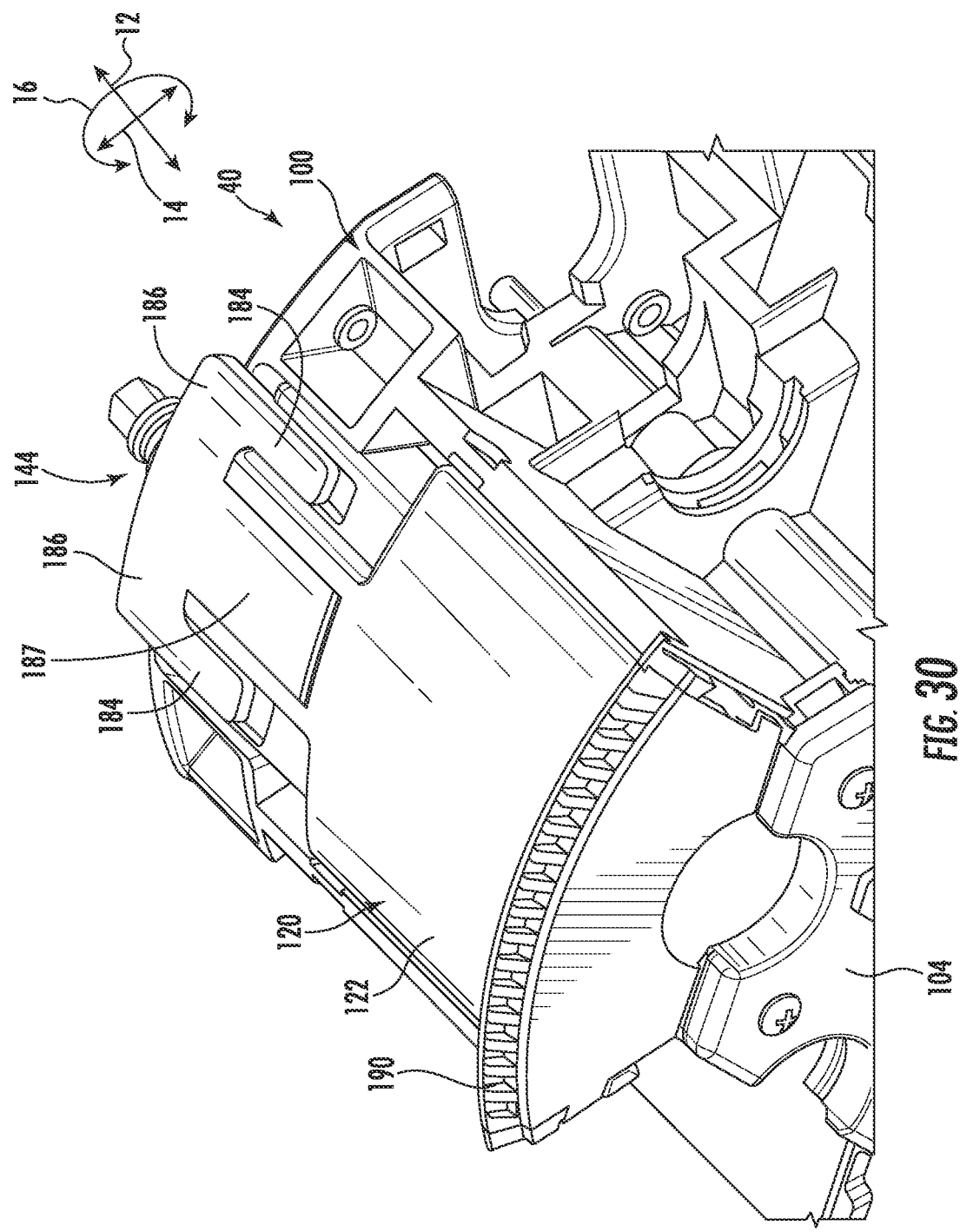
FIG. 30 is a bottom perspective view of a wedge assembly after connection to a base in accordance with embodiments of the present disclosure.

Referring now to FIGS. 23 through 30, in some embodiments a latch assembly 181 may further include a stop member 187. Stop member 187 may be connected to the tab(s) 182, latch(es) 184, or bridge 186, and may selectively limit movement of the latch assembly 181 and thus movement of the tabs 182 between the engaged and disengaged positions. In particular, the stop member 187 may be movable between a first position which limits movement of the adjustable tab(s) 182 and a second position in which movement of the adjustable tab(s) 184 is not limited by the stop member 187. When the stop member 187 is in the first position, the adjustable tab(s) 184 may be prevented from movement to the disengaged position. When the stop member 187 is in the second position, the adjustable tab(s) 184 may be free to move to the disengaged position (as discussed above). FIGS. 23-26 and 30 illustrate embodiments in which the stop member 187 is in the first position, while FIGS. 27 through 29 illustrate embodiments in which the stop member 187 is in the second position. FIGS. 23-26 and 30 further illustrate embodiments in which the tab(s) 184 are in the engaged position. FIG. 27 illustrates an embodiment in which the tab(s) 184 are in the engaged position, but the stop member 187 has been moved to the second position to facilitate movement of the tab(s) 184 to the disengaged position. FIGS. 28 and 29 illustrate embodiments in which the tab(s) 184 are in the disengaged position.

In exemplary embodiments as shown, the stop member 187 may be connected to and extend from the bridge 186. For example, as shown, the stop member 187 may be cantilevered from the bridge 186. In exemplary embodiments, the stop member 187 may be pivotable between the first position and the second position. For example, to move the stop member 187 from the first position to the second position, the stop member 187 may be actuated by a user, such as by the user applying pressure on the stop member 187 such as along a direction perpendicular to the longitudinal axis 12 (e.g. along the radial axis 14). Such pressure may pivot or otherwise move the stop member 187 from the first position to the second position, which in turn allows for movement of the tabs 182 from the engaged position to the disengaged position as discussed above.

In exemplary embodiments, the stop member 187 may include a lip 188. Lip 188 may be disposed proximate a distal end 189 of the stop member 187 (relative to an end connected to another component of the latch assembly 181, such as the bridge 186. Lip 188 may engage the outer cover 122 when in the first position, as shown in particular in FIG. 26. As shown, if an attempt is made to actuate the latch assembly 181 such that the tab(s) 182 are moved from the engaged position to the disengaged position while the stop member 187 is in the first position, the lip 188 may contacts a corresponding outer surface 123 of the outer cover 122 and limit or prevent such actuation and movement. However, if an attempt is made to actuate the latch assembly 181 such that the tab(s) 182 are moved from the engaged position to the disengaged position while the stop member 187 is in the second position, the lip 188 may be out of alignment with the corresponding outer surface 123 such that no contact is made, thus allowing free actuation and movement as discussed above.

Figure 31:
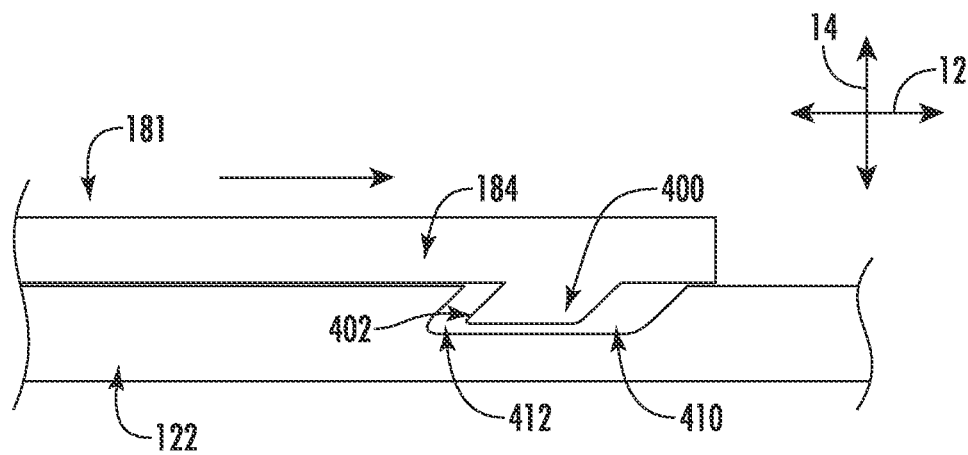
FIG. 31 is a side view of a portion of latch assembly in a disengaged position in accordance with embodiments of the present disclosure.
Figure 32:
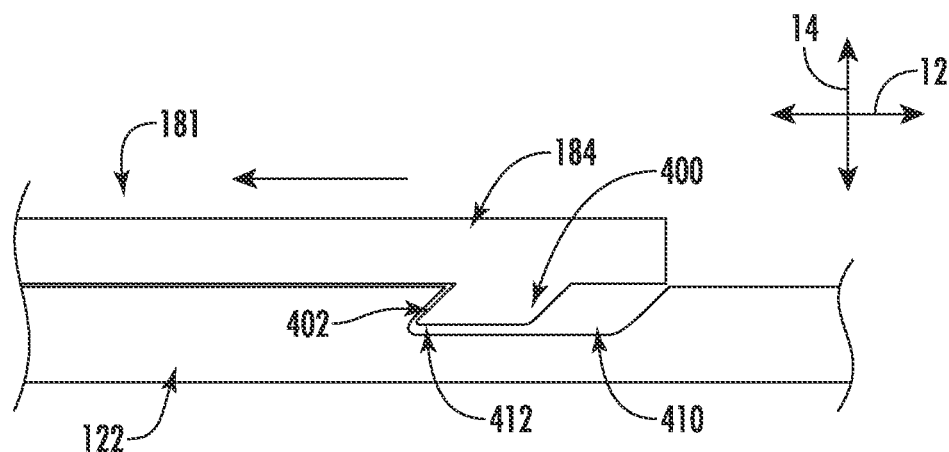
FIG. 32 is a side view of a portion of latch assembly in an engaged position in accordance with embodiments of the present disclosure.

Referring now to FIGS. 31 and 32, latch assembly 181, such as the latches 184 thereof, may include one or more retention members 400 which interact with the outer cover 122 to advantageously secure and maintain the connection of the latch assembly 181 with the outer cover 122. Each retention member 400 may extend from the latch assembly 181, such as from a latch 184 along the radial axis 14. Further, each retention member 400 may have a wedge-shape extending along the longitudinal axis 12, thus terminating in a wedge tip 402. The outer cover 122 may include one or more retention pockets 410 defined therein. Each retention pocket 410 may include a wedge-shaped portion 412. When a wedge assembly 120 is assembled, each retention member 400 may be disposed in an associated pocket 410. When the latch assembly 181 and tabs 182 thereof are in the engaged position, as illustrated in FIG. 32, the wedge tips 402 are disposed in the respective wedge-shaped portions 412. Such positioning of the wedge tips 402 prevents the retention members 400 from being removed from the pockets 410 (such as along the radial axis 14), thus securing and maintaining the connection of the latch assembly 181 with the outer cover 122.

Such secure connection may be particularly advantageous during use of the wedge assembly 120. For example, as discussed, the tabs 182 are movable between engaged and disengaged positions. FIG. 31 illustrates movement of the retention members 400 from the engaged position to the disengaged position. In the disengaged position, as shown, the wedge tips 402 may be partially or fully removed (e.g. along the longitudinal axis 12) from the wedge-shaped portions 412. FIG. 32 illustrates movement of the retention members 400 from the disengaged position to the engaged position. As discussed herein, such movement may be caused by a spring bias (via, for example, springs 185). During such movement, the wedge tips 402 may be reinserted into the wedge-shaped portions 412, advantageously ensuring that the spring-biasing force does not cause separation of the latch assembly 181 from the outer cover 122.

Figure 15:
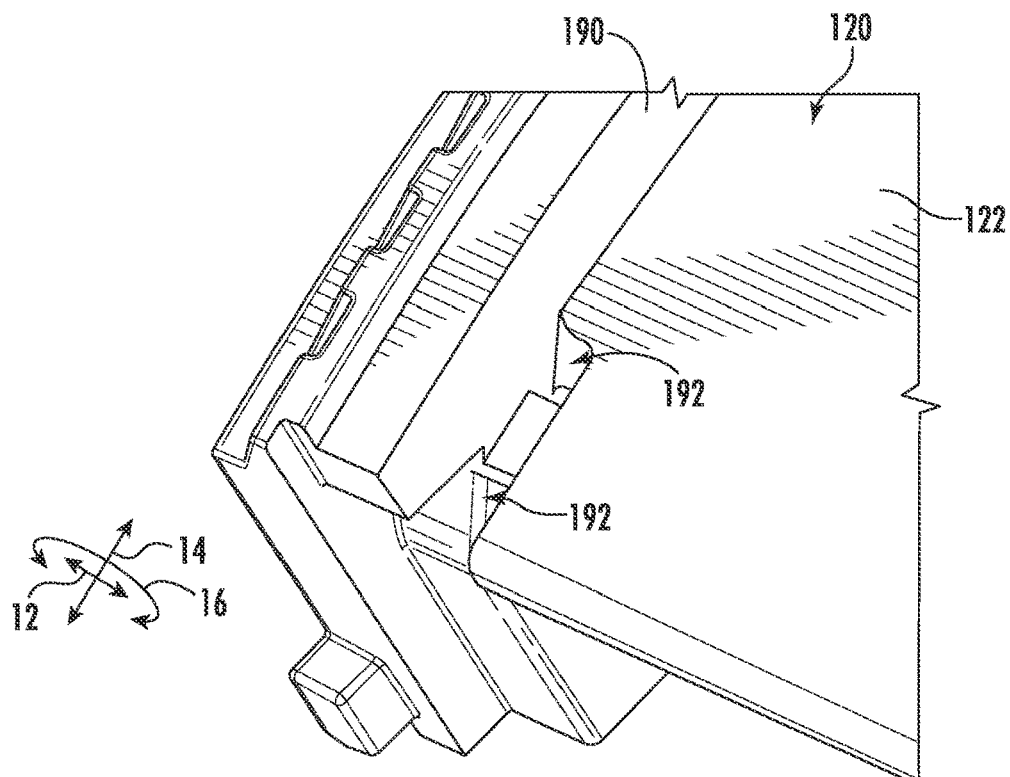
FIG. 15 is a perspective view of a lower portion of a wedge assembly without a gel for illustrative purposes in accordance with embodiments of the present disclosure.
Figure 16:
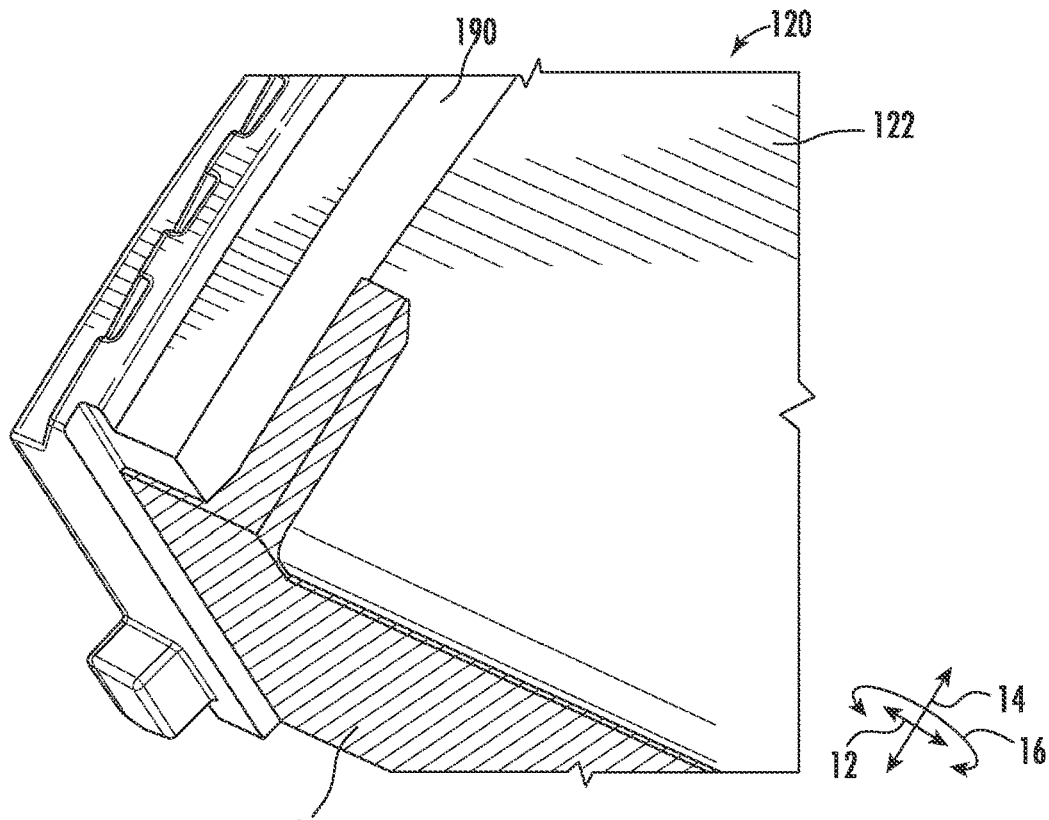
FIG. 16 illustrates the wedge assembly of FIG. 15 with the gel.

Referring now to FIGS. 15 and 16, each wedge assembly 120 may further include an outer flange 190 which extends, such as outwardly along the radial axis 14, from the outer cover 122. One or more apertures 192 may be defined in the wedge assembly 120, such as at an intersection between the outer flange 190 and outer cover 122. Each aperture 192 may, for example, be defined in the outer flange 190, the outer cover 122, or both. The second gel 126 may extend through each aperture 192, such that a portion of the second gel 126 is exterior to the wedge assembly 120. This portion of the second gel 126 may advantageously contact the seal member 52 to facilitate improved sealing, and may further ensure stability of the second gel 126 relative to the outer cover 122. This portion of the second gel 126 is particularly advantageous in providing improved sealing, because it acts as a "triple point" providing/facilitating a seal between the cover 20 and wedge assembly 120 (via interaction with the seal member 52, and in particular the O-ring 53 thereof), between the cover 20 and the base housing 100, and between the base housing 100 and the wedge assembly 120.

Additionally, a "bump" or outwardly expanding portion 196 may be defined between the outer flange 190 and outer cover 122. Such bump 196 expand radially outwardly as it extends longitudinally from the outer cover 122 towards the outer flange 190. Such bump 196 may advantageously serve as a locating and sealing feature for the seal assembly 50 against the wedge assembly 120.

Notably, the base housing 100 may include similar outer flange 190 and bump features 196 as those discussed herein with respect to the wedge assemblies 120, such that the outer flanges 190 and bump features 196 formed together are generally fully annular when the base 40 is assembled.

Figure 13:
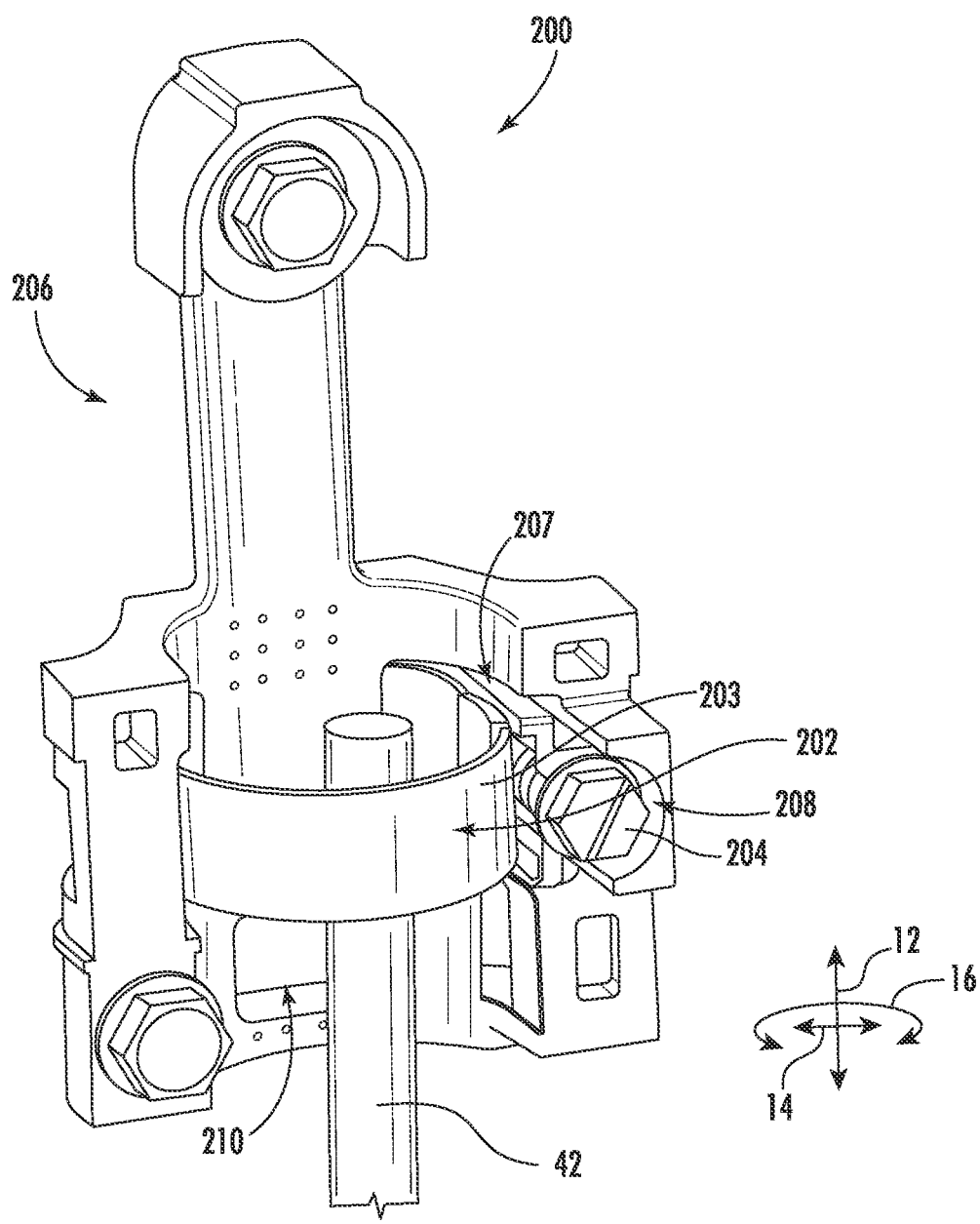
FIG. 13 is a front perspective view of a cable collar assembly in accordance with embodiments of the present disclosure.
Figure 14:
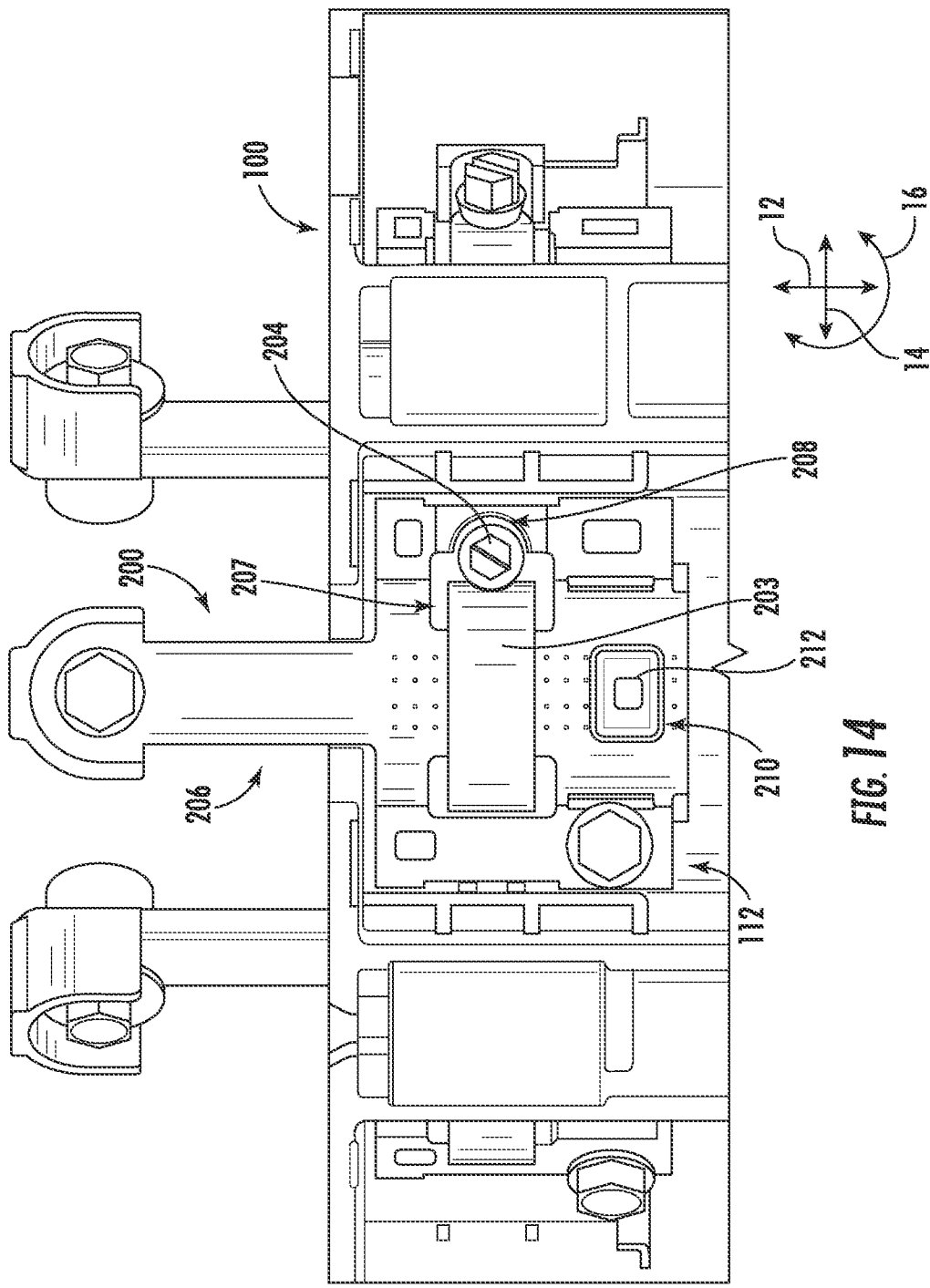
FIG. 14 is a front perspective view of a cable collar assembly in a cavity in accordance with embodiments of the present disclosure.

Referring now to FIGS. 13 and 14, base 40 may further include a plurality of cable collar assemblies 200. Collar assemblies 200 may be utilized to initially position cables 42 in the cavities 106, and to prevent radial or axial movement of the cables 42 once connected and sealed within the base 40. Each cable collar assembly 200 may be insertable into one of the plurality of cavities 106, such as the cable retention portion 112 thereof. Each assembly 200 may include a cable clamp 202 and a frame 206. Clamp 202 may include a band 203 and nut 204, and frame 206 may define a passage 207 and a slot 208. During assembly, the band 203 may be routed through the passage 207 and around the cable 42. The nut 204 may then be utilized to tighten the band 203. During such tightening, the nut 204 may become positioned in the slot 208, and thus advantageously not impede any connections or sealing within the base 40.

In exemplary embodiments, an aperture 210 may be defined in the frame 206, and this aperture may mate with a protrusion 212 provided in the cavity 106, such as in the cable retention portion 112. The interaction between the aperture 210 and the protrusion 212 may further position the collar assembly 220 appropriately in the cavity 106, such as in the cable retention portion 112.

During assembly, a collar assembly 200 may initially be connected to a cable 42. The collar assembly 200 and associated cable 42 may then be inserted into a cavity 106. For example, the collar assembly 200 may be inserted into the cable retention portion 112 of the cavity 106. After such insertion, a wedge assembly 120 may be connected to the base housing 100. Once such connection has occurred, the actuator 144 may be actuated to provide the seal around the cable 42. In some cases, additional pressurization of the sealing gel(s) may occur when the closure 10 is put under pressure, such as underwater. For disassembly, the above-discussed steps may simply be reversed.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A butt closure base, comprising:
   a base housing extending along a longitudinal axis between a first outer surface and a second outer surface, the base housing defining a plurality of cavities between the first and second outer surfaces, the plurality of cavities aligned in an annular array;
   a plurality of wedge assemblies, each of the plurality of wedge assemblies removably insertable into one of the plurality of cavities, each of the plurality of wedge assemblies comprising a latch assembly, the latch assembly comprising an adjustable tab and a stop member movable between a first position which limits movement of the adjustable tab and a second position in which movement of the adjustable tab is not limited by the stop member, wherein the adjustable tab removably connects the wedge assembly to the base housing.

2. The butt closure base of claim 1, wherein the stop member is pivotable between the first position and the second position.

3. The butt closure base of claim 1, wherein the stop member comprises a lip which engages the outer cover in the first position and does not engage the outer cover in the second position.

4. The butt closure base of claim 1, wherein the adjustable tab is a plurality of adjustable tabs, the latch assembly further comprises a bridge connecting the adjustable tabs, and the stop member extends from the bridge.

5. The butt closure base of claim 1, further comprising a plurality of latches connected to the bridge.

6. The butt closure base of claim 1, wherein the adjustable tab is movable to a disengaged position when the stop member is in the second position and not movable to the disengaged position when the stop member is in the first position.

7. The butt closure base of claim 1, wherein each of the plurality of cavities is defined between surfaces of opposing sidewalls, and wherein the surfaces extend substantially parallel to each other.

8. The butt closure base of claim 1, further comprising a gel disposed in at least one of the cavities or the wedge assemblies.

9. A butt closure base, comprising:
   a base housing extending along a longitudinal axis between a first outer surface and a second outer surface, the base housing defining a plurality of cavities between the first and second outer surfaces, the plurality of cavities aligned in an annular array, wherein a first gel is disposed in each of the plurality of cavities;
   a plurality of wedge assemblies, each of the plurality of wedge assemblies removably insertable into one of the plurality of cavities and removably connectable to the base housing, each of the plurality of wedge assemblies comprising an outer cover and a second gel, each of the plurality of wedge assemblies further comprising a latch assembly, the latch assembly comprising a stop member movable between a first position which limits movement of the latch assembly and a second position in which movement of the latch assembly is not limited by the stop member.

10. The butt closure base of claim 9, wherein the stop member is pivotable between the first position and the second position.

11. The butt closure base of claim 9, wherein the stop member comprises a lip which engages the outer cover in the first position and does not engage the outer cover in the second position.

12. The butt closure base of claim 9, wherein the latch assembly comprises a plurality of adjustable tabs and a bridge connecting the adjustable tabs, and wherein the stop member extends from the bridge.

13. The butt closure base of claim 9, further comprising a plurality of latches connected to the bridge.

14. The butt closure base of claim 9, wherein the latch assembly comprises an adjustable tab, wherein the adjustable tab is movable to a disengaged position when the stop member is in the second position and not movable to the disengaged position when the stop member is in the first position.

15. The butt closure base of claim 9, wherein each of the plurality of cavities is defined between surfaces of opposing sidewalls, and wherein the surfaces extend substantially parallel to each other.

* * * * *